US011213450B2

(12) United States Patent
Yasuhara et al.

(10) Patent No.: US 11,213,450 B2
(45) Date of Patent: Jan. 4, 2022

(54) TRAVEL MOTION ASSIST DEVICE

(71) Applicant: HONDA MOTOR CO., LTD., Tokyo (JP)

(72) Inventors: Ken Yasuhara, Wako (JP); Yosuke Ikedo, Wako (JP); Toru Takenaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/761,408

(22) PCT Filed: Sep. 25, 2018

(86) PCT No.: PCT/JP2018/035493
§ 371 (c)(1),
(2) Date: May 4, 2020

(87) PCT Pub. No.: WO2019/093000
PCT Pub. Date: May 16, 2019

(65) Prior Publication Data
US 2021/0000678 A1 Jan. 7, 2021

(30) Foreign Application Priority Data
Nov. 8, 2017 (JP) .............................. JP2017-215247

(51) Int. Cl.
A61H 3/00 (2006.01)
A61H 1/02 (2006.01)
B25J 11/00 (2006.01)
(52) U.S. Cl.
CPC ............. *A61H 3/00* (2013.01); *A61H 1/0244* (2013.01); *B25J 11/008* (2013.01);
(Continued)

(58) Field of Classification Search
CPC .. A61H 3/00; A61H 1/0244; A61H 2203/007; A61H 2201/163;
(Continued)

(56) References Cited

U.S. PATENT DOCUMENTS 7,731,670 B2   6/2010   Aguirre-Ollinger et al.
8,773,148 B2   7/2014   Sankai et al.
(Continued)

FOREIGN PATENT DOCUMENTS

JP   2010517616 A   5/2010
JP   2014128464 A   7/2014
(Continued)

OTHER PUBLICATIONS

English translation of International Search Report for International Application No. PCT/JP2018/035493, dated Nov. 20, 2018, 2 pages.

*Primary Examiner* — Jerrah Edwards
*Assistant Examiner* — Aren Patel
(74) *Attorney, Agent, or Firm* — Armstrong Teasdale LLP

(57) ABSTRACT

Provided is a travel motion assist device capable of assisting a travel motion of a user without causing any discomfort, and has a high level of versatility. A travel motion assist device includes an assist drive unit configured to be worn on a prescribed joint of the user required for the travel motion of the user, and to be driven in a corresponding manner, a torso motion detection unit configured to be worn on a torso of the user, and to detect the displacement of a center of gravity C indicating the movement of the torso, and a control unit configured to control an operation of the assist drive unit, wherein the control unit estimates a phase of the travel motion of the user according to a detection result of the torso motion detection unit, and drives the assist drive unit at a prescribed phase.

9 Claims, 16 Drawing Sheets

(52) U.S. Cl.
CPC .. *A61H 2003/007* (2013.01); *A61H 2201/163* (2013.01); *A61H 2201/165* (2013.01); *A61H 2201/1642* (2013.01); *A61H 2201/5058* (2013.01)

(58) Field of Classification Search
CPC ...... A61H 2201/1642; A61H 2201/165; A61H 2201/5058; B25J 11/008
See application file for complete search history.

(56) References Cited

U.S. PATENT DOCUMENTS

| | | | |
|---|---|---|---|
| 9,572,520 | B2 | 2/2017 | Hashimoto et al. |
| 9,833,375 | B2 | 12/2017 | Miyake |
| 10,350,129 | B2 | 7/2019 | Takenaka et al. |
| 10,576,619 | B2 | 3/2020 | Shim et al. |
| 2010/0094188 | A1* | 4/2010 | Goffer ............... A61H 1/0266 602/23 |
| 2014/0100493 | A1* | 4/2014 | Craig ................. A61H 3/00 601/35 |
| 2015/0134080 | A1* | 5/2015 | Roh ................... B25J 9/0006 623/32 |
| 2015/0196403 | A1* | 7/2015 | Kim ................... A61H 1/0244 623/24 |
| 2015/0351995 | A1* | 12/2015 | Zoss .................. B25J 9/0006 623/32 |
| 2017/0252255 | A1* | 9/2017 | Asano ................ B25J 9/163 |

FOREIGN PATENT DOCUMENTS

| | | |
|---|---|---|
| JP | 2016123855 A | 7/2016 |
| JP | 2016214504 A | 12/2016 |
| JP | 2017046977 A | 3/2017 |
| WO | 2009084387 A1 | 7/2009 |
| WO | 2013094747 A1 | 6/2013 |

* cited by examiner

TRAVEL MOTION ASSIST DEVICE

CROSS-REFERENCE TO RELATED APPLICATIONS

This application is a U.S. National Phase Application of PCT/JP2018/035493, filed Sep. 25, 2018, which claims the benefit of priority to JP Application No. 2017215247, filed Nov. 8, 2017, the contents of which are hereby expressly incorporated by reference in their entirety.

TECHNICAL FIELD

The present disclosure relates to a travel motion assist device configured to be worn by a user to assist the user's travel motion.

BACKGROUND ART

In recent years, there have been active research efforts on wearable motion assist devices for welfare and medical applications. A synchronization control is known as one of such control methods for such motion assist devices. The synchronization control is aimed at achieving a coordinated movement between the human and the device (see, for example, Patent Documents 1 and 2). In the synchronization control described in Patent Document 1, a phase acquisition unit is formed by an interaction force detection sensor that detects the interaction force between the motion of the user's joint and the motion of the corresponding joint of the motion assist device, a joint angle sensor that detects the joint angle of the motion assist device's joint, and a phase estimation unit that estimates the phase of the motion of the user's joint based on the detected interaction force and joint angle, and performs a synchronization control of the motion assist device's joint based on a phase oscillator model that uses the phase of the motion of the user's joint as an input oscillation. According to Patent Document 2, a synchronization control is performed by using a hip joint nerve oscillator based on the interaction force generated between the hip joint and the hip joint actuator.

Additionally known is a wearable motion assist device which is provided with a load measuring unit including at least two reaction force sensors that are closely attached to different points on the sole of a user's foot to detect the movement of the weight of the user via changes in electrostatic capacitance so that the position of the gravitational center of the user may be estimated from the loads detected by the load measuring unit. The drive timing of the drive motor is timed with the movement of the user to step forward. See Patent Document 3.

PRIOR ART DOCUMENT(S)

Patent Document(s)

Patent document 1: WO2013/0097747
Patent document 2: JP2017-46977A
Patent document 3: WO2009/084387

SUMMARY OF THE INVENTION

Task to be Accomplished by the Invention

However, in the motion assist device described in Patent Documents 1 and 2, the joint (actuator) of the assist device is controlled according to the interaction force between the joint of the user to be assisted and the joint of the assist device so that the interaction force changes due to the assist force generated by the joint of the assist device. In other words, the physical quantity detected by the sensor of the motion assist device is a result of the interaction between the motion assist device and the user, and is not due to the movement of the user alone. Therefore, the stronger the assist force is, and the larger the mass, friction, and moment of inertia on the motion assist device is relative to those of the user, the smaller the user's motion becomes, and the smaller the effect of the user's motion on the interaction becomes. Thus, when the control is performed based on the interaction force that changes according to the movement of the joint of the motion assist device, the user feels as if he or she is being forced to move by the motion assist device and may experience some discomfort.

Furthermore, according to the motion assist device disclosed in Patent Document 3, two or more reaction force sensors are required to be provided on each of the left and right feet, or four or more reaction force sensors are required in total. The application point of the body weight of the user can be detected by providing the reaction force sensors on the toes and heels of the user's feet, but the gravitation center of the user cannot be accurately estimated from the detection data of the reaction force sensors. For example, if the user is unable to move the ankle joint like a healthy person, the deviation between the estimated center of gravity and the actual center of gravity could be significant. If an assist force is applied based on the incorrectly identified center of gravity, the user may experience some discomfort in maintaining gait and balance. Thus, although the motion assist device disclosed in Patent Document 3 can detect the timing of the grounding and lifting of the user's foot, and the drive motor can be driven based on the detected timing, the drive motor cannot be driven in a more correct timing different from the detecting timing. Therefore, there is a significant restriction on the range of the assist mode to which the control can be applied so that the versatility of the motion assist device is limited.

In view of such a problem of the prior art, a primary object of the present invention is to provide a travel motion assist device which is simple in structure, is capable of assisting a travel motion of a user without causing any discomfort, and has a high level of versatility.

Means to Accomplish the Task

To achieve such an object, the present invention provides a travel motion assist device (1, 101) configured to be worn by a user to assist a travel motion of the user (U), comprising: an assist drive unit (2, 3, 4; 104, 114, 115) configured to be worn on a prescribed joint of the user required for the travel motion of the user, and to be driven so as to assist a prescribed joint movement associated with the travel motion; a torso motion detection unit (6, 107) configured to be worn on a torso (upper body) of the user, and to detect a motion of a torso (upper body) of the user (displacement of a center of gravity C); and a control unit (5, 105) configured to control an operation of the assist drive unit; wherein the control unit estimates a phase ($\Phi$) of the travel motion of the user according to a detection result of the torso motion detection unit, and drives the assist drive unit at a prescribed phase.

Here, the term "travel motion" includes walking motion as well as running motion. In addition, the term "assisting joint movement" includes any action that exerts an assist force or an assistive torque to the user's body, as well as an action that stimulates a muscle to encourage the joint movement of the user. The "torso movement" includes the displacement of the user's center of gravity or the center of gravity of the torso, and the displacement of the center of gravity may mean the amount of change in the position of the center of gravity, as well as the speed and acceleration of the center of gravity.

Since the human travel motion is a combination of the movements of various parts of the human body that moves the center of gravity of the human body, it is preferable to control the assist drive unit that assists the joint motion based on the displacement of the center of gravity. According to the present configuration, the control unit estimates a phase of the travel motion of the user based on the displacement of the user's center of gravity, and drives the assist drive unit at a predetermined phase which implies or signifies a predetermined center of gravity position. Therefore, it is possible to assist the joint movement at the desired center of gravity position, and the versatility of the travel motion assist device is high. In addition, because the user's motion is assisted based on the center of gravity where the action of the support appears (by feedback), the travel motion can be assisted by the support of the joint motion without causing discomfort to the user in the motion. In addition, the torso motion detection unit installed in the user's torso can detect the displacement of the user's center of gravity so that the structure can be simplified.

Preferably, the control unit (5, 105) is configured to estimate a grounding timing (0 [rad]) of a leg of the user (U) according to the detection result of the torso motion detection unit (6, 107), and to drive the assist drive unit (2, 3, 4; 104, 114, 115) at a prescribed phase difference (β) relative to the estimated grounding timing.

Since the assist drive unit can be operated based on the position of the center of gravity at the grounding timing, motion assist can be performed in a variety of modes so that the versatility can be increased.

Preferably, the torso motion detection unit includes an acceleration sensor (6, 107) that detects an acceleration (Gx, Gy) of the torso of the user.

The displacement of the gravitational center of the user can be detected by using an inexpensive acceleration sensor.

Preferably, the acceleration sensor includes a lateral acceleration sensor (6) that detects a lateral acceleration (Gy) of the torso of the user (U).

In the travel motion of a human, the gravitational center moves in the lateral direction as the right and left legs ground alternately. By detecting the lateral acceleration of the user which is produced in a manner that corresponds to the right and left legs of the user, the phase of the travel motion of the user, including the distinction between right and left, can be estimated.

Preferably, the acceleration sensor includes a vertical acceleration sensor (107) that detects a vertical acceleration (Gx) of the torso of the user (U).

In the travel motion of a human, the grounding and lifting of a leg which is a major and instantaneous event in the travel motion appears with a strong correlation with the vertical acceleration of the torso. According to this arrangement, by detecting the vertical acceleration which has a strong correlation with the events in the travel motion, the phase of the travel motion of the user estimated with a high precision.

Preferably, the assist drive unit (2, 3, 4) is configured to apply an assist force (τ) to a femoral part of the user to assist a flexing motion and an extending motion of a hip joint of the user (U).

Thereby, the flexing motion and the extending motion of a hip joint which is a major factor and requires a large force in the travel motion can be assisted.

Preferably, the assist drive unit (104, 114, 115) is configured to apply an assist force to a foot of the user to assist a plantar flexion motion and a dorsiflexion motion of an ankle joint of the user.

Thereby, the plantar flexion and dorsiflexion of the ankle joint which is a major factor in the travel motion and has a strong influence on the displacement of the gravitation center can be assisted.

Preferably, the control unit is configured to drive the assist drive unit (2, 3, 4; 104, 114, 115) in synchronism with a movement of the torso of the user (U).

Thereby, the prescribed joint motion associated with the travel motion can be assisted in synchronism with the movement of the torso of the user so that the user is prevented from experiencing discomfort.

Preferably, the control unit (5, 105) is configured to drive the assist drive unit (2, 3, 4; 104, 114, 115) in synchronism with the movement of the torso of the user (U) which is based on at least a rotational speed or an inclination angle of the torso of the user.

Thereby, even when the user is traveling in namba walking (bi-axial walking), the prescribed joint motion associated with the traveling motion can be assisted in synchronism with the twisting movement (yaw movement) of the torso of the user.

Effect of the Invention

The present invention thus provides a travel motion assist device which is simple in structure, is capable of assisting a travel motion of a user without causing any discomfort, and has a high level of versatility.

BRIEF DESCRIPTION OF THE DRAWING(S)

DESCRIPTION OF THE PREFERRED EMBODIMENT(S)

Figure 1:
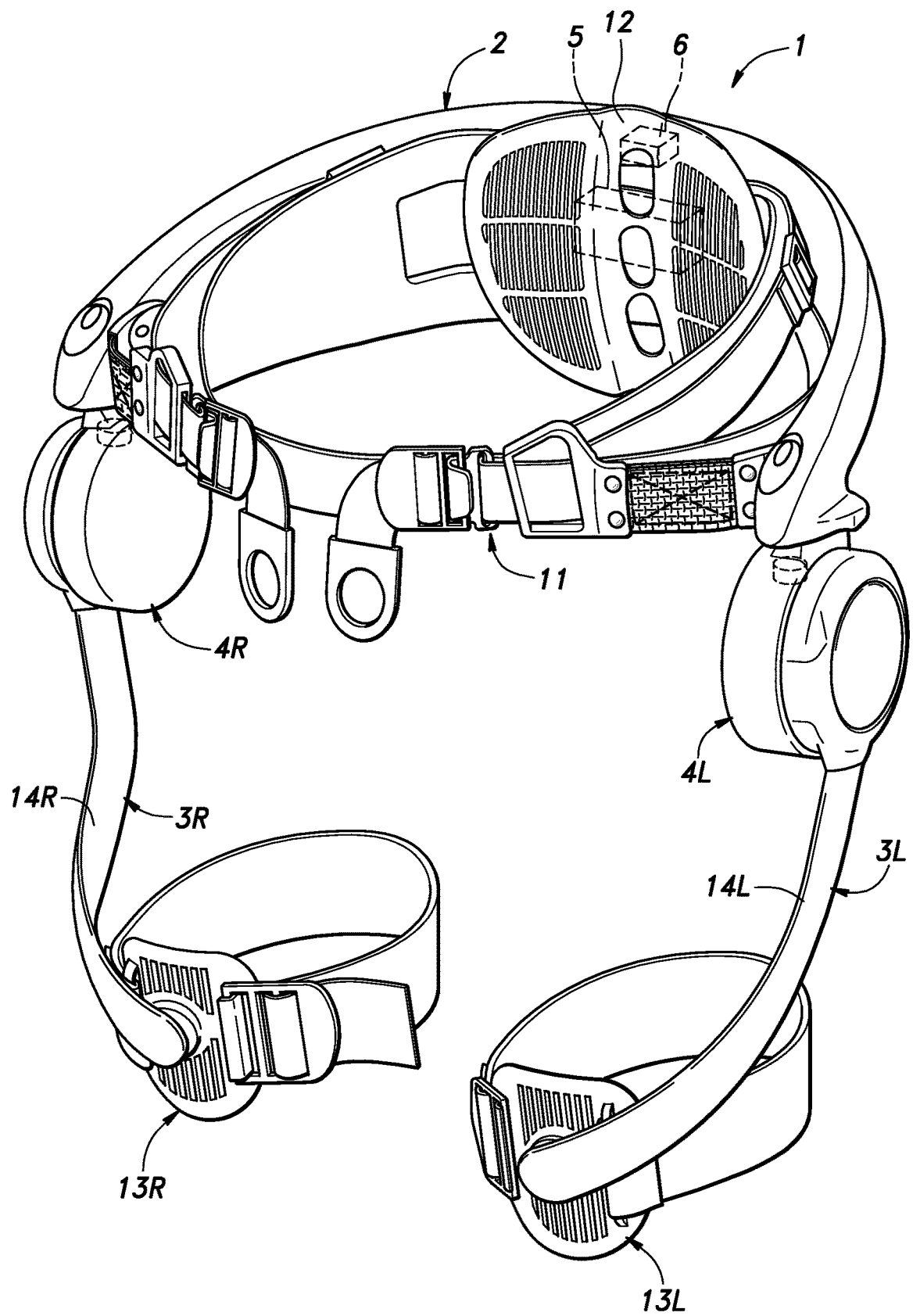
FIG. 1 is a perspective view of a walking motion assist device according to a first embodiment of the present invention.

Embodiments of the present invention are described in the following in detail with reference to the appended drawings. Letters "L" and "R" are appended to the reference numerals to distinguish between the left and the right of the legs and other objects, but such letters may be omitted when distinction between right and left is not relevant or when a vector expression not requiring the distinction between left and right is used. The symbols "+" and "−" are used for distinguishing between the flexing motion (forward motion) of the leg (femoral part in particular) and the extending motion (rearward motion) of the leg.

First, the first embodiment of the present invention is described in the following with reference to FIGS. 1 to 13. FIG. 1 is a perspective view of the walking motion assist device 1 according to the first embodiment. As shown in FIG. 1, the walking motion assist device 1 is provided with a main frame 2 configured to be fitted on the torso of a user U or a human P, a pair of subframes 3L, 3R attached to the respective legs of the user U and connected to the main frame 2 so as to be movable around the hip joints of the user U, a pair of drive sources 4L, 4R for moving the left and right subframes 3L, 3R relative to the main frame 2, respectively, a control unit 5 (see FIG. 4) configured to control the movements of left and right drive sources 4L, 4R, a lateral acceleration sensor 6 placed on the main frame 2 to detect the lateral acceleration Gy of the torso of the user U, and a battery (not shown) for supplying electric power to the left and right drive sources 4L, 4R, and the control unit 5.

The main frame 2 is composed of a combination of rigid materials such as hard resin or metal and flexible materials such as fibers, and is formed in a curved shape so as to closely wrap around the user's waist from behind, and is attached to the waist by a belt 11 connected to the main frame 2. A lumbar support 12 formed by a flexible material is attached to the front of the main frame 2 (at a part thereof opposing the back of the lumbar portion of the user U).

Each subframe 3L, 3R is provided with a leg support 13L, 13R and an arm portion 14L, 14R. The leg support 13 comprises a combination of a rigid material and a flexible material, and is attached to the femoral part of the user on the corresponding side. The arm portion 14 is formed of hard resin or metal and extends downwardly along the femoral part to connect the output shaft of the drive source 4 with the corresponding leg support 13. In other words, the subframes 3L, 3R are connected to the main frame 2 via the drive source 4.

Each drive source 4 is provided with a motor, and one or both of a reduction mechanism and a compliance mechanism as required. The drive source 4 applies power to the arm portion 14 by receiving a controlled electric power from the battery so as to provide a required assist force τ (assist torque) under the control of the control unit 5. The power applied to the arm portion 14 is transmitted to the femoral part of the user U via the leg support 13.

The lateral acceleration sensor 6 detects the lateral acceleration Gy in the part of the main frame 2 close to the center of gravity C of the user U, and outputs a signal corresponding to the lateral acceleration Gy. The signal representing the lateral acceleration Gy provided by the lateral acceleration sensor 6 is forwarded to the control unit 5.

Figure 2:
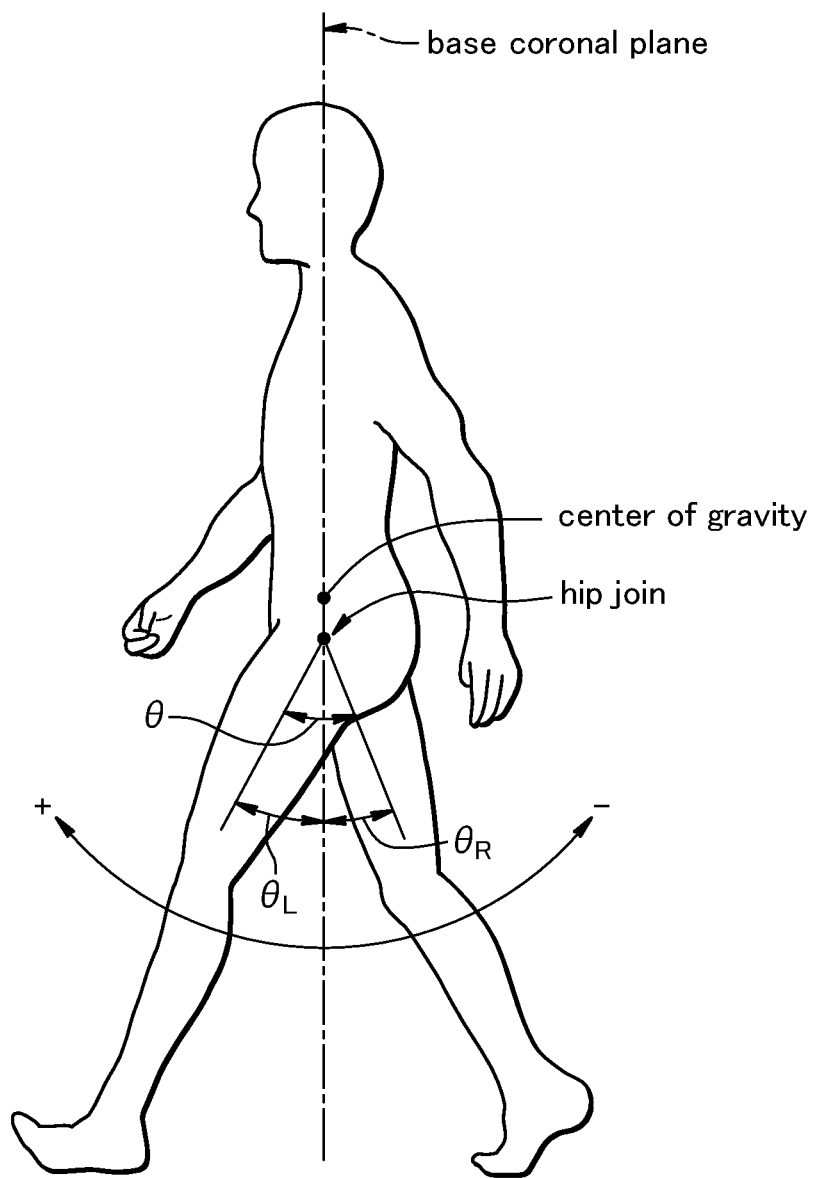
FIG. 2 is a side view of a human in a walking motion showing the position of the center of gravity.

FIG. 2 is a side view showing the position of the center of gravity C of the human P during walking. The human P walks by flexing and extending the left and right legs (lower limbs). The walking motion of human P is a combination of the movements of the left and right legs, the left and right arms, and the torso around the center of gravity C of the human P. The center of gravity C of the human P is slightly higher than the hip joint on the base frontal plane. In other words, the lateral acceleration Gy of the center of gravity C of the user U can be analogously detected by detecting a part of the main frame 2 close to the center of gravity C of the human P by using the lateral acceleration sensor 6 (FIG. 1).

The center of gravity C of the human P moves vertically, horizontally and in the fore and aft direction as the human P walks. When the human P walks with a constant stride, whereas the position of the center of gravity C of the human P with respect to the vertical direction is constant when averaged over the entire walking cycle, the position of the center of gravity C of the human P with respect to the vertical direction changes during each walking cycle. The vertical displacement of the center of gravity C of the human P with respect to an initial value (such as the value at the time of turning on the power of the walking assist device while the user is in an upright posture) is referred to the vertical position Px of the center of gravity C. Similarly, when the human P is walking straight, whereas the position of the center of gravity C of the human P with respect to the lateral direction is constant when averaged over the entire walking cycle, the position of the center of gravity C of the human P with respect to the lateral direction changes during each walking cycle. The lateral displacement of the center of gravity C of the human P with respect to an initial value is referred to as the lateral position Py of the center of gravity C. When the human P is walking at a constant speed, whereas the speed of the center of gravity C of the human P with respect to the fore and aft direction is constant when averaged over the entire walking cycle, the speed of the center of gravity C of the human P with respect to the fore and aft direction changes during each walking cycle. In other words, the fore and aft position of the center of gravity C of the human P changes with respect to a hypothetical center of gravity of the human that travels at an average speed during each walking cycle. The fore and aft displacement of the center of gravity C with respect to the hypothetical center of gravity is referred to as the fore and aft position of the center of gravity C.

The flexing and extending movements of the left and right legs cause corresponding changes in the left and right hip joint angles θL and θR. The hip joint angle θL, θR is defined as the angle between a straight line segment representing the base frontal plane and a straight line segment representing the femoral part when human P is viewed from the normal direction of the sagittal plane. The hip joint angle θL, θR is positive (+) when the femoral part is flexed (forward) from the base frontal plane, and negative (−) when the femoral part is extended (backward) from the base frontal plane. The flexing and extending movements of the arm cause corresponding changes in the angle of the shoulder joint, and by generating a reaction force associated with the flexing and extending movements of the leg, the torsional movement of the torso is reduced.

As shown in FIG. 1, the battery is secured to the main frame 2 so as to be accommodated inside the main frame 2, for example, and supplies electric power to the control unit 5 and the drive sources 4L, 4R. The control unit 5 and the battery may be attached to or received in the subframe 3, but may also be provided separately from the walking motion assist device 1.

The control unit 5 is composed of an electronic circuit unit including a CPU, a RAM, a ROM, etc., all received in the main frame 2, and is configured to execute the control process for the operation of the drive sources 4L, 4R and, hence, for the control of the assist force τ acting on the user U. That the control unit 5 is configured to execute a predetermined arithmetic process means that the central processing unit (CPU) comprising the control unit 5 is programmed to read necessary data and application software from a memory device (memory) and to execute the predetermined arithmetic process according to the software.

The walking motion assist device 1 thus configured assists the walking motion of the user U wearing the device by applying the power of the battery-powered drive sources 4 (assist force τ) to the user U as a walking aid via the main frame 2 and the subframes 3L and 3R.

Figure 3:
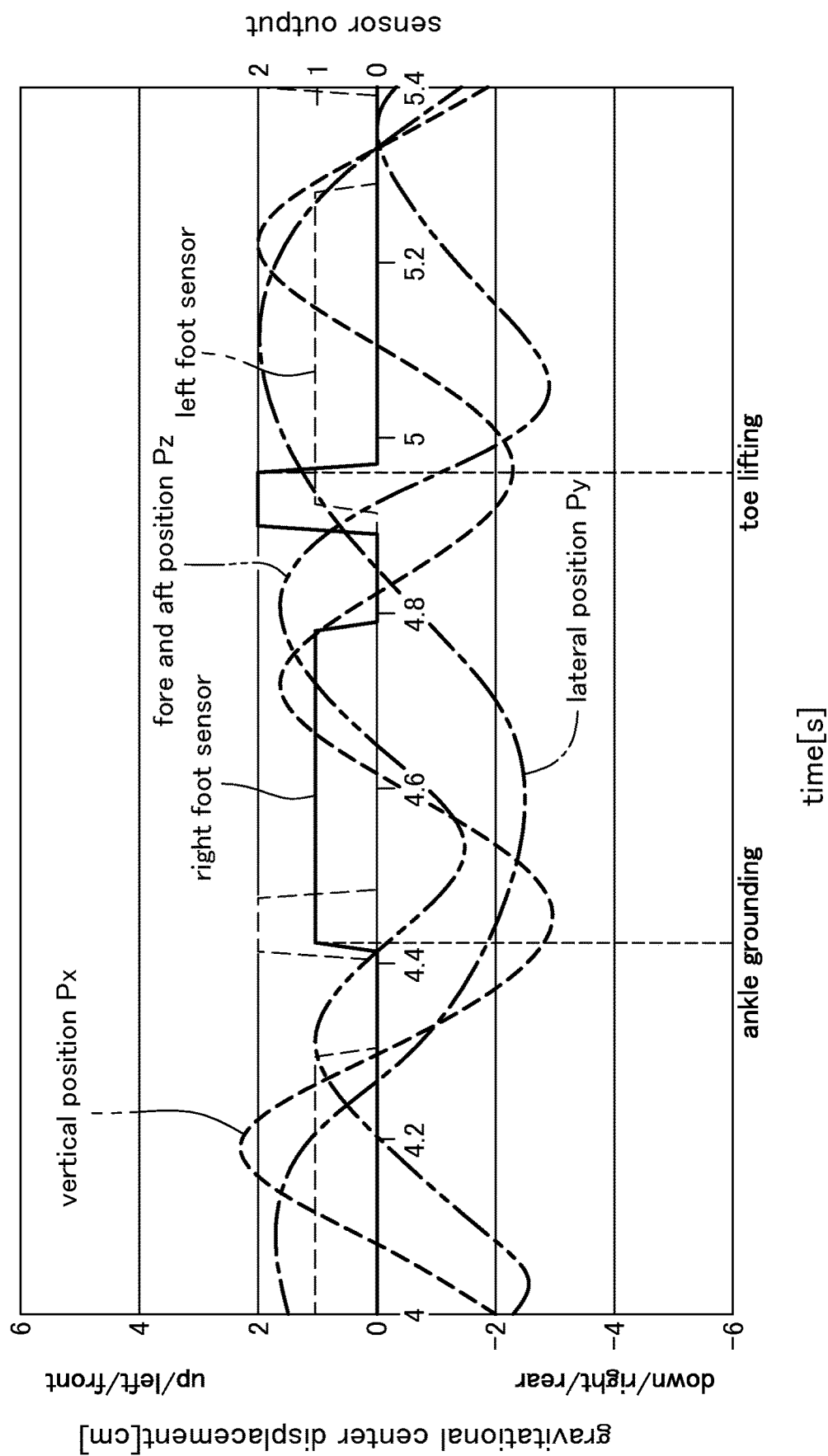
FIG. 3 is a time chart of the position of the gravitational center of the human walking at a constant speed.

Next, referring to FIG. 3, the change in the position of the center of gravity C of the human P during the walking motion is described. FIG. 3 is a time chart showing the position of the center of gravity C of the human P while walking at a constant speed. The horizontal axis of the graph represents time, and the vertical axis of the graph represents the position of the center of gravity C. The position of the center of gravity C is broken into three components extending along the three axes, respectively, and is thus represented by the vertical position Px, the lateral position Py, and the fore and aft position Pz. The positive direction along the vertical axis corresponds to the upward direction, the leftward direction and the forward direction, and the negative direction along the vertical axis corresponds to the downward direction, the rightward direction and the rearward direction. FIG. 3 also shows the outputs of the left and right foot sensors. Each foot sensor is configured to detect a pressure on the heel and the toe, and produces "1" when the heel is grounded, "2" when the toe is grounded, and "0" when the sole is entirely grounded or the foot is not grounded. The scale of the output of the foot sensor is shown on the right side of the graph. The left leg is grounded before the right leg is lifted from the ground, and is lifted from the ground after the right leg is grounded.

The vertical position Px of the center of gravity C has a cyclic period of ½ of the walking cycle, and is displaced in such a manner that the lower peak appears when each of the left and right legs grounds or leaves the ground, and the upper peak appears between the succeeding lower peaks. The lateral position Py of the center of gravity C has a cyclic period equal to the walking cycle, and generally moves rightward when the right foot is grounded (during the period of about 4.4 sec to 5 sec) and leftward when the right foot is not grounded (generally when the left foot is grounded). The fore and aft position Pz of the center of gravity C has a cyclic period of ½ of the walking cycle, and is displaced in such a manner that the rear peak appears immediately after each of the left and right legs grounds, and the front peak appears immediately before each of the left and right legs leaves the ground Thus, the vertical position Px, the lateral position Py, and the fore and aft position Pz of the center of gravity C are related to the walking cycle in a certain manner. Therefore, the phase of the walking cycle can be estimated by detecting at least one of these positions. In the present embodiment, the lateral acceleration Gy of the center of gravity C is detected by the lateral acceleration sensor 6, and the control unit 5 calculates the lateral position Py of the center of gravity C from the detected lateral acceleration Gy to estimate the phase of the walking motion, and controls the drive source 4 so that an assist force T is generated at a predetermined phase.

Figure 4:
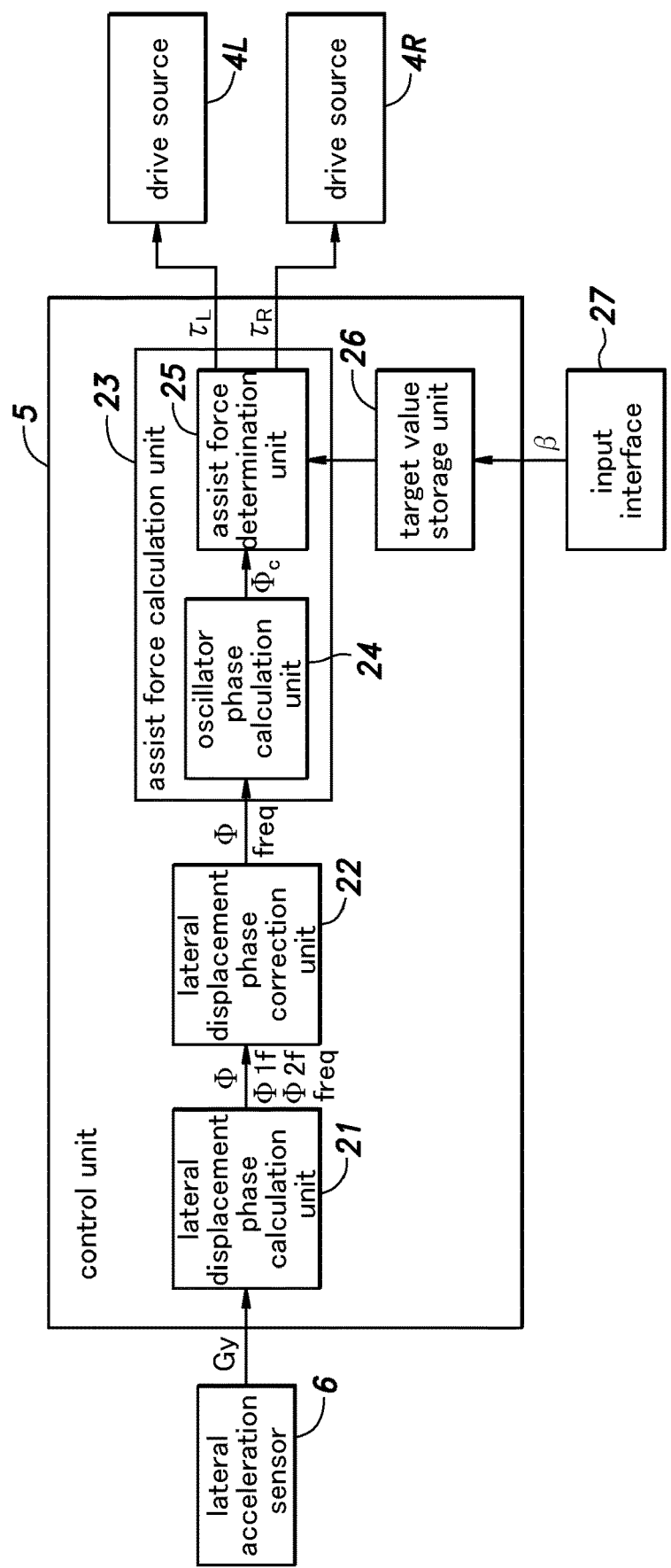
FIG. 4 is a block diagram showing the structure of the control unit shown in FIG. 1.

The control unit 5 is described in the following. FIG. 4 is a block diagram showing the configuration of the control unit 5 shown in FIG. 1. As shown in FIG. 4, the control unit 5 is provided with a lateral displacement phase calculation unit 21 that calculates various values such as the lateral displacement phase Φ (the phase of the center of gravity C in the walking motion of the user U) and the walking frequency freq by executing the calculation process described below based on the lateral acceleration Gy of the center of gravity C detected by the lateral acceleration sensor 6. In addition, the control unit 5 is provided with a lateral displacement phase correction unit 22 that corrects the lateral displacement phase Φ calculated by the lateral displacement phase calculation unit 21, and an assist force calculation unit 23 that calculates the assist force τ (τL, τR) for the left and right legs by executing the calculation process (which is described later) based on the lateral displacement phase Φ corrected by the lateral displacement phase correction unit 22.

The assist force calculation unit 23 includes an oscillator phase calculation unit 24 that calculates the oscillator phase Φc of a phase oscillator that oscillates synchronously with the lateral displacement phase Φ by executing a calculation process using a phase oscillator corresponding to the walking frequency freq of the user U wearing the walking motion assist device 1, based on the lateral displacement phase Φ and the walking frequency freq corrected by the lateral displacement phase correction unit 22, and an assist force determination unit 25 that determines the assist force T to be applied to the right and left legs by executing the calculation process (which will be described hereinafter) based on the oscillator phase Φc calculated by the oscillator phase calculation unit 24.

In addition, control unit 5 has a target value storage unit 26 for storing a target phase difference β which is to be referred to by the assist force calculation unit 23 when calculating the assist force τ. The target phase difference β is input by an operation of the input interface 27 such as a tablet device. The input interface 27 may or may not be incorporated in the control unit 5.

When the power supply is turned on and powered up, the control unit 5 drives the drive sources 4L and 4R to exert assist forces τL and τR determined from the output of the lateral acceleration sensor 6.

Next, the lateral displacement phase calculation unit 21 shown in FIG. 4 of the present embodiment is described in the following. As shown in the block diagram of FIG. 5, the lateral displacement phase calculation unit 21 has various functional units (31 to 38) that perform various calculations or execute processes which will be described later. The lateral displacement phase calculation unit 21 executes the process of each of these functional units in a prescribed calculation cycle of the control unit 5. Each functional unit is described individually in the following.

Figure 6A:
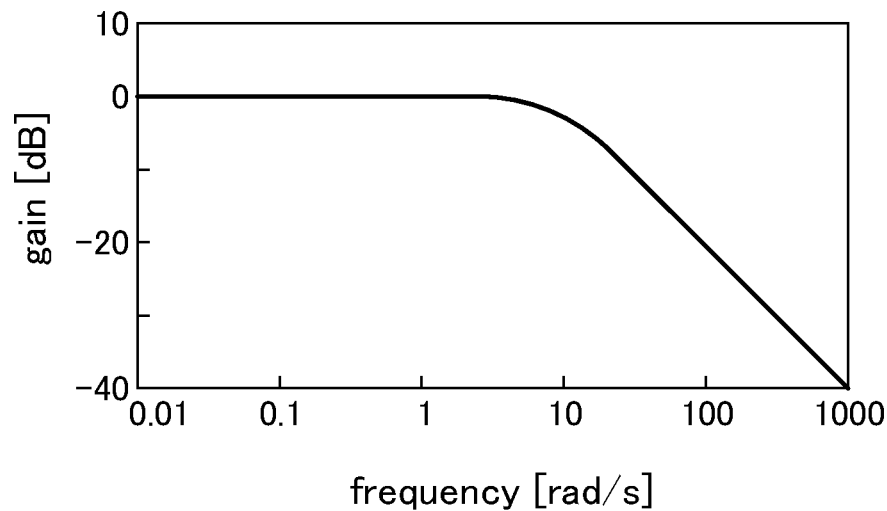
FIG. 6A is a Bode diagram of the first low pass filter shown in FIG. 5.
Figure 6B:
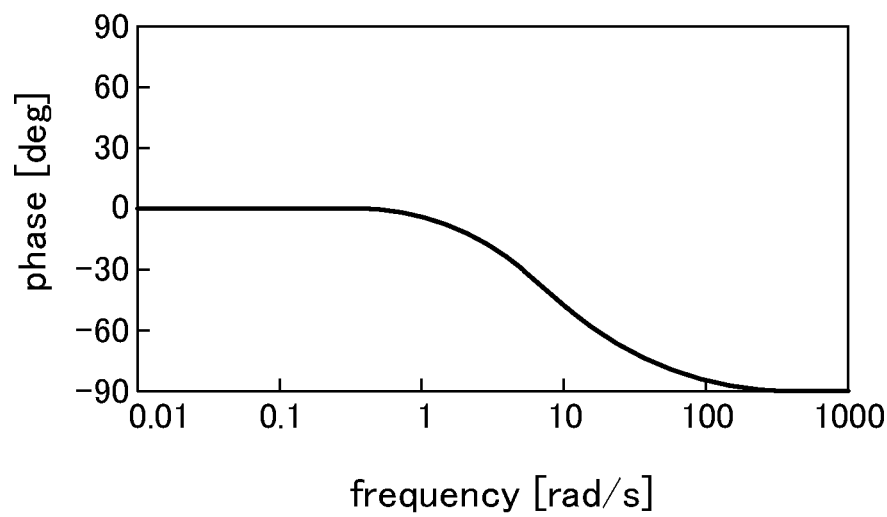
FIG. 6B is a Bode diagram of the first low pass filter shown in FIG. 5.

The lateral displacement phase calculation unit 21 executes, first of all, the process of the first low-pass filter 31 in each process cycle of the control unit 5. The first low-pass filter 31 cuts off high-frequency components from the signal corresponding to the lateral acceleration Gy of the center of gravity C output by the lateral acceleration sensor 6, and performs a low-pass (high-cut) process to allow low-frequency components to pass through. FIG. 6 shows a Bode diagram of the first low-pass filter 31. As shown in the gain diagram in (A), it is preferable that the cutoff frequency of the first low-pass filter 31 to be set to a frequency (2 Hz to 3 Hz) higher than the typical walking frequency that is associated with the walking movement of the user U. Also, as shown in the phase diagram in (B), the lateral acceleration Gyf of the center of gravity C processed by the first low-pass filter 31 has a phase characteristic $\Phi 1f$ (freq) expressed as a mathematical function of frequency.

Figure 5:
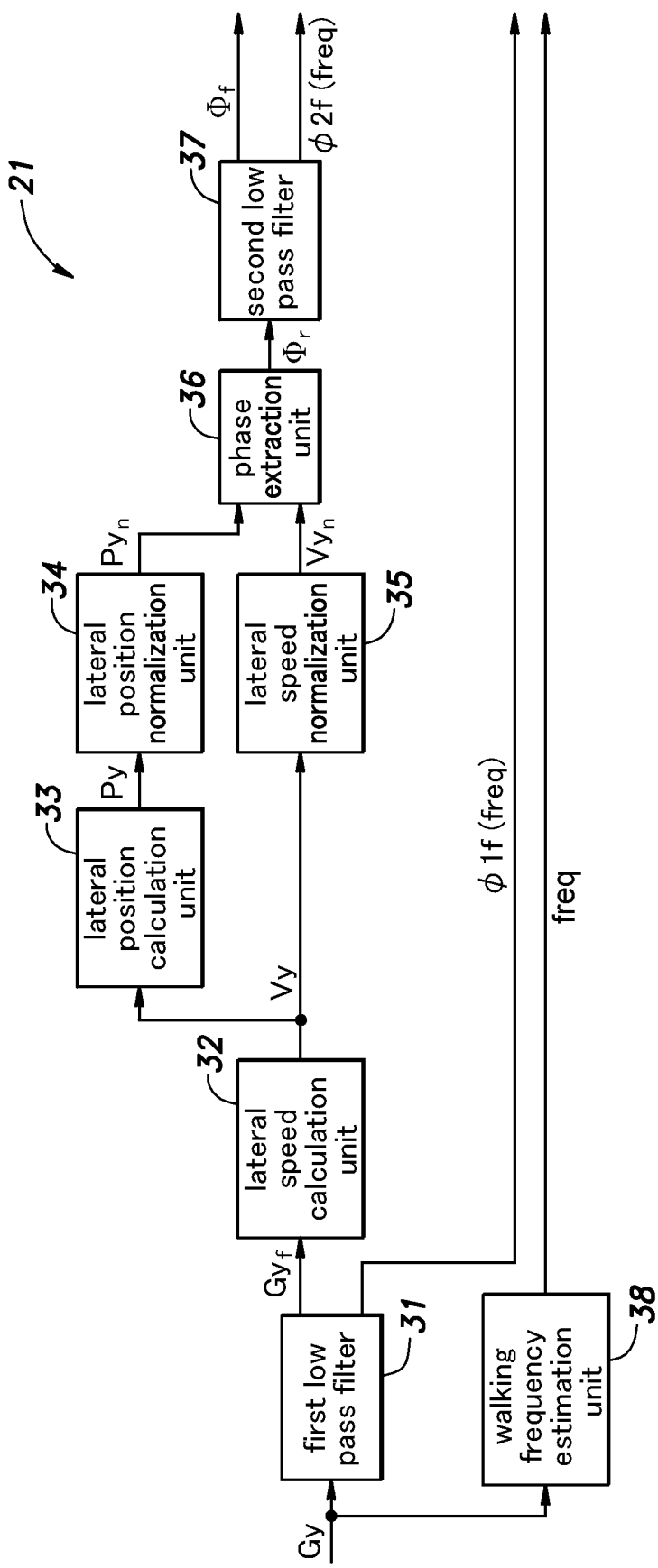
FIG. 5 is a block diagram showing the structure of the lateral displacement phase calculation unit shown in FIG. 4.

Following the process of the first low-pass filter 31, the lateral displacement phase calculation unit 21 executes the process of the speed calculation unit 32 as shown in FIG. 5. The lateral speed calculation unit 32 calculates the lateral speed Vy of the center of gravity C by integrating the lateral acceleration Gyf of the center of gravity C which has been processed by the first low-pass filter 31 as shown in Equation (1) given below.

$$Py=\Sigma Gyf \qquad (1)$$

Following the process of the lateral speed calculation unit 32, the lateral displacement phase calculation unit 21 executes the process of the lateral position calculation unit 33 as shown in FIG. 5. The lateral position calculation unit 33 calculates the lateral position Py of the center of gravity C by integrating the lateral speed Vy of the center of gravity C calculated by the lateral speed calculation unit 32 as shown in Equation (2) given below.

$$Py=\Sigma Vy \qquad (2)$$

Following the process of the lateral position calculation unit 33, the lateral displacement phase calculation unit 21 executes the process of the lateral position normalization unit 34 as shown in FIG. 5. The lateral position normalization unit 34 normalizes the current lateral position Py calculated by the lateral position calculation unit 33 according to a predetermined rule using the maximum and minimum values of the lateral position Py in the preceding walking cycle, and outputs the normalized lateral position Pyn. More specifically, the lateral position normalization unit 34 normalizes the lateral position Py of the center of gravity C by executing the computation of Equation (3) given below (according to the arithmetic rule).

$$Pyn=(Py-(Py_{MAX}+Py_{MIN})/2/\{(Py_{MAX}-Py_{MIN})/2\} \qquad (3)$$

where $Py_{MAX}$ is the maximum lateral position in the preceding walking cycle, and $Py_{MIN}$ is the minimum lateral position in the preceding walking cycle.

The numerator of lateral position Pyn in equation (3) given above represents the removal of offset so that the absolute values of the positive and negative peaks of the lateral position Py in the walking motion in the preceding walking cycle are equal to each other, and the denominator represents the amplitude of the lateral position Py in the walking motion in the preceding walking cycle. Therefore, as the user U performs the walking motion, the lateral position Py is normalized by the lateral position normalization unit 34 by executing the operation of Equation (3).

Following the process of the lateral speed calculation unit 32, the lateral displacement phase calculation unit 21 executes the process of the lateral speed normalization unit 35 as shown in FIG. 5. The lateral speed normalization unit 35 normalizes the current lateral speed Vy of the center of gravity C calculated by the lateral speed calculation unit 32 according to a predetermined rule using the maximum and minimum values of the lateral speed Vy of the center of gravity C in the previous walking cycle, and outputs the normalized lateral speed Vyn of the center of gravity C. More specifically, the lateral speed normalization unit 35 normalizes the lateral speed Vy of the center of gravity C by executing the operation of Equation (4) given below (according to the arithmetic law).

$$Vyn=(Vy-(Vy_{MAX}+Vy_{MIN})/2/\{(Vy_{MAX}-Vy_{MIN})/2\} \qquad (4)$$

where $Vy_{MAX}$ is the maximum lateral speed in the preceding walking cycle, and $Vy_{MIN}$ is the minimum lateral speed in the preceding walking cycle.

The numerator of the lateral speed Vyn of the center of gravity C in Equation (4) given above represents the removal of offset in such a manner that the absolute values of the positive and negative peaks of the lateral speed Vy of the center of gravity C in the walking motion of the preceding walking cycle are equal to each other, while the denominator represents the amplitude of the lateral speed Vy of the center of gravity C in the walking motion of the preceding walking cycle. Therefore, as the user U performs the walking motion, the lateral speed normalization unit 35 normalizes the lateral speed Vyf of the center of gravity C by executing the computation of Equation (4).

Following the process of the lateral speed normalization unit 35, and the process of the lateral position normalization unit 34, the lateral displacement phase calculation unit 21 executes the process of the phase extraction unit 36. The phase extraction unit 36 calculates the lateral displacement phase $\Phi r$ by executing an inverse tangent operation, for example, based on the lateral speed Vyn of the center of gravity C normalized by lateral speed normalization unit 35 and the lateral position Pyn normalized by lateral position normalization unit 34. More specifically, the phase extraction unit 36 calculates the lateral displacement phase $\Phi r$ in the phase plane of the lateral position Pyn and the lateral speed Vyn of the center of gravity C as shown in FIG. 7, by executing Equation (5) given below.

$$\Phi r=\arctan[(-Vy/Vy_{MAX})/[Py-[\{(Py_{MAX}-Py_{MIN})/2\}/(Py_{MAX}-Py_{MIN})]]] \qquad (5)$$

Figure 7:
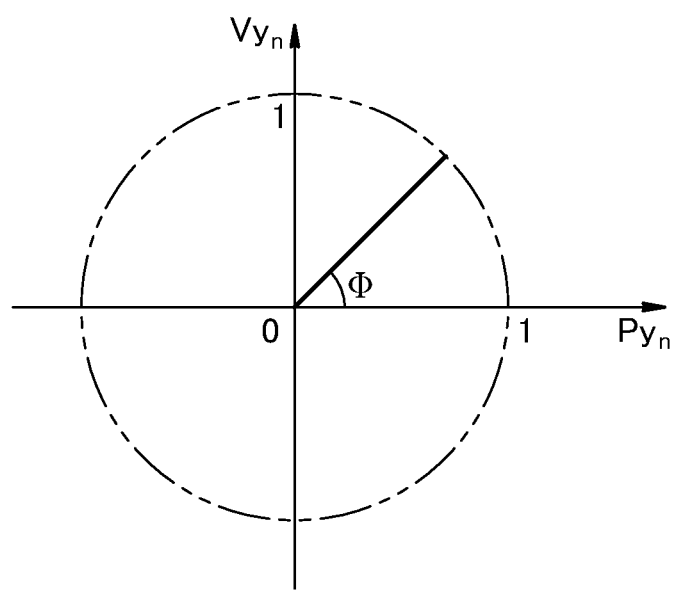
FIG. 7 is a diagram illustrating the lateral displacement phase of the gravitational center.

The lateral displacement phase $\Phi r$, calculated from Equation (5), represents the progress of motion in each cycle of the walking motion consisting of two steps, or one step by the left leg and one step by the right leg as schematically shown in the phase planes of FIG. 7.

In addition, following the process of the phase extraction unit 36, the lateral displacement phase calculation unit 21 executes the process of the second low-pass filter 37. The second low-pass filter 37 performs a low-pass (high-cut) process to block high-frequency components from the signal corresponding to the lateral displacement phase $\Phi r$ calculated by the phase extraction unit 36 while allowing low-frequency components to pass through. As opposed to the cutoff frequency of the first low-pass filter 31, the cutoff frequency of the second low-pass filter 37 is preferably set at a frequency (0.5 Hz to 1 Hz) equal to or higher than the typical walking frequency that is associated with the walking movement of the user U. The lateral displacement phase $\Phi f$ which is processed by the second low-pass filter 37 has a phase characteristic which is expressed as a mathematical function of frequency $\Phi 2f$ (freq).

In addition, the lateral displacement phase calculation unit 21 executes the process of the walking frequency estimation unit 38 in parallel with the above processes in each process cycle of the control unit 5. The walking frequency estimation unit 38 estimates the walking frequency freq based on the lateral acceleration Gy of the center of gravity C. For example, the walking frequency estimation unit 38 may use a fast Fourier transform or a wavelet transform to calculate the walking frequency freq. When the walking frequency estimation unit 38 calculates the walking frequency freq, a window function is applied. The interval of the window function is selected so as to cover the lateral acceleration Gy of the center of gravity C over a plurality of walking steps.

Figure 8:
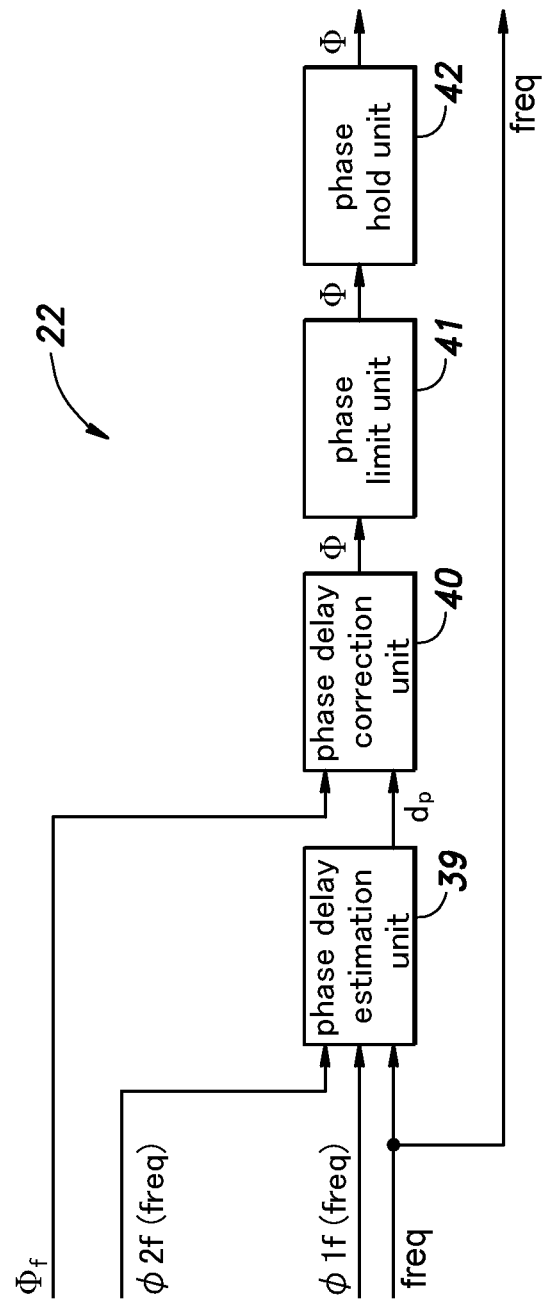
FIG. 8 is a block diagram showing the structure of the lateral displacement phase correction unit shown in FIG. 4.

Following the process of the lateral displacement phase calculation unit 21, the control unit 5 executes the process of the lateral displacement phase correction unit 22 shown in FIG. 8. As shown in the block diagram of FIG. 8, the lateral displacement phase correction unit 22 has various functional units (39-42) that perform the arithmetic operations or processes which will be described later. The lateral displacement phase correction unit 22 executes the process of each of these functional units at a predetermined arithmetic process cycle of the control unit 5. Each functional unit is described individually in the following.

Following the process of the walking frequency estimation unit 38 and the process of the second low-pass filter 37, the lateral displacement phase correction unit 22 executes the process of the phase delay estimation unit 39. The phase delay estimation unit 39 estimates the phase delay dp based on the phase characteristic $\Phi 2f$(freq) of the lateral displacement phase $\Phi f$ which has passed through the second low-pass filter 37, the phase characteristic $\Phi 1f$ (freq) of the lateral acceleration Gy of the center of gravity C which has passed through the first low-pass filter 31, and the walking frequency freq calculated by the walking frequency estimation unit 38. The phase delay dp is calculated according to Equation (6) which is given below.

$$dp = \Phi 1f(\text{freq}) + \Phi 2f(\text{freq}) \quad (6)$$

This phase delay dp is due to the passing of the signal through the filter. Alternatively, the phase delay dp may be a delay in the center of gravity displacement relative to the signal output timing of the foot sensor, instead of the delay relative to the signal before passing through the filter.

Then, the lateral displacement phase correction unit 22 executes the process of the phase delay correction unit 40. The phase delay correction unit 40 corrects the lateral displacement phase $\Phi f$ that has passed through the second low-pass filter 37 based on the phase delay dp calculated by the phase delay estimation unit 39, and outputs the corrected lateral displacement phase $\Phi$. More specifically, the lateral displacement phase correction unit 22 calculates the lateral displacement phase $\Phi$ by performing an arithmetic operation to subtract the phase delay dp from the lateral displacement phase $\Phi f$, as expressed in Equation (7) given below.

$$\Phi = \Phi f - dp \quad (7)$$

After executing the process of the phase delay correction unit 40, the lateral displacement phase correction unit 22 executes the process of the phase limiting unit 41. The phase limiting unit 41 performs a correction so as to limit the value of the lateral displacement phase $\Phi$ to $2\pi$ when the lateral displacement phase $\Phi$ calculated by the phase delay correction unit 40 exceeds $2\pi 0$ (rad).

The lateral displacement phase correction unit 22 executes the process of the phase limiting unit 41, and then executes the process of the phase hold unit 42. The phase hold unit 42 performs a correction so as to prevent the lateral displacement phase $\Phi$ from reverting to a smaller value by holding the lateral displacement phase $\Phi$ corrected by the phase limiting unit 41. Thus, the lateral displacement phase $\Phi$ corrected by the lateral displacement phase correction unit 22 and the walking frequency freq calculated by the walking frequency estimation unit 38 (shown in FIG. 5) are provided to the assist force calculation unit 23 (shown in FIG. 4).

Figure 9:
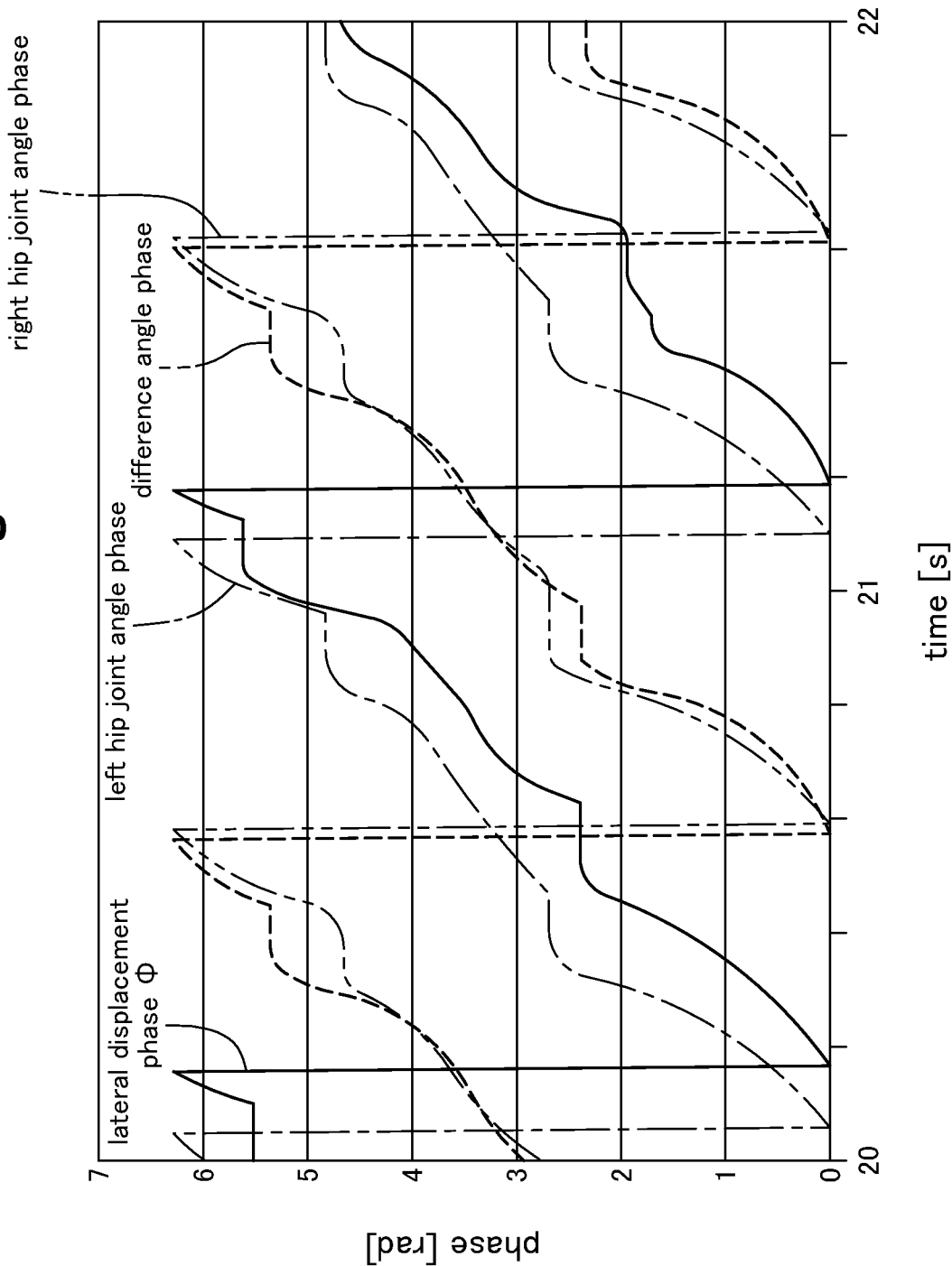
FIG. 9 is a time chart showing the lateral displacement phase of the gravitational center and the phase of the leg.

The lateral displacement phase $\Phi$ corrected by the lateral displacement phase correction unit 22 is calculated so as to be 0 (rad) at the peak of the lateral position Py on the positive side (left side) (or when the lateral speed Vy goes from positive to zero). FIG. 9 is a time chart showing the phase of the leg along with the lateral displacement phase $\Phi$. To obtain the phase of the legs, the left and right hip joint angles $\theta L$ and $\theta R$ shown in FIG. 2 are measured to calculate the hip join angle phases of the left leg and the right left, and to calculate the difference angle phase as a phase of the difference angle $\theta$ given as a difference between the left and right hip joint angles $\theta L$ and $\theta R$.

As shown in FIG. 2, the difference angle $\theta$ is the flex angle of the left leg with respect to the right leg, and is calculated as a positive value when the right leg is on the flexing side (forward) more than the left leg and a negative value when the left leg is on the extending side (backward) more than the right leg. When the user U stands upright with the two legs aligned with each other, the left and right hip joint angles $\theta L$ and $\theta R$ are the same so that the difference angle $\theta$ is 0.

As shown in FIG. 9, the left and right hip angle phases appear in a generally similar shape with a timing different of ½ of the walking cycle, and become 0 (rad) slightly before the grounding timing of the corresponding leg. The difference angle phase appears slightly different from the right and left hip joint angle phases because the changes in the hip joint angles $\theta L$ and $\theta R$ are somewhat different between the flexing and extending movements of the leg, but are in synchronism with the right hip joint angle phase so that the difference angle phase becomes zero (rad) substantially at the same timing as the right hip joint angle phase. As can be seen from this comparison, the lateral displacement phase $\Phi$ appears with a shape close to the difference angle phase but with a certain phase difference with respect to the difference angle phase. This phase difference is almost constant in the case of a healthy person, and is advanced by a prescribed phase difference from the grounding timing of the left leg when the lateral displacement phase $\Phi$ is 0 (rad). Therefore, the grounding timing of the left and right legs can be estimated from the lateral displacement phase $\Phi$. For details of the differential angle phase, reference should be made to JPB59388124 by the present applicant.

Figure 10:
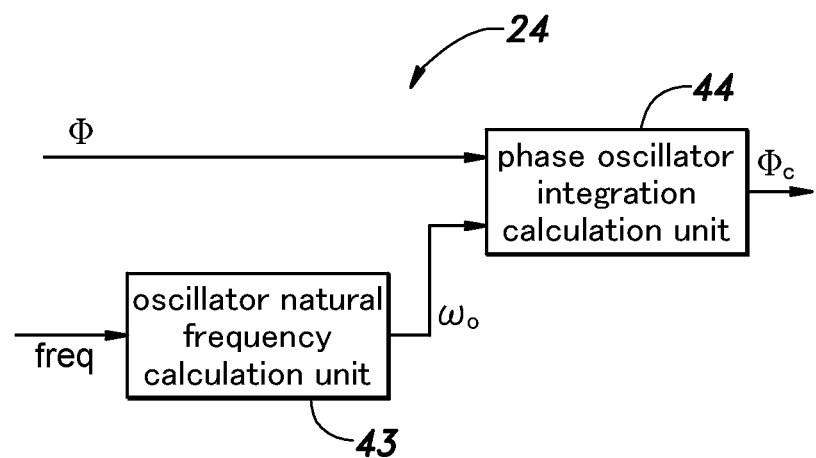
FIG. 10 is a block diagram showing the structure of the oscillator phase calculation unit shown in FIG. 4.
Figure 11:
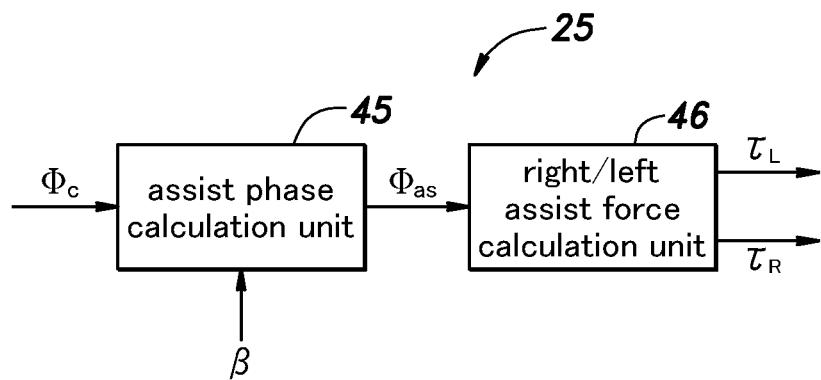
FIG. 11 is a block diagram showing the structure of the assist force determination unit shown in FIG. 4.

Next, the oscillator phase calculation unit 24 of the present embodiment shown in FIG. 4 is described in the following with reference to the block diagram of FIG. 10. The oscillator phase calculation unit 24 includes an oscillator natural frequency calculation unit 43 and a phase oscillator integration calculation unit 44 as part of various functional units to perform the calculations or processes described in the following. The oscillator phase calculation unit 24 executes the processes of these functional units 43, 44 at the predetermined arithmetic process cycle of the control unit 5.

The oscillator natural frequency calculation unit 43 calculates the oscillator natural frequency $\omega o$ which is the natural angular frequency of the oscillator based on the walking frequency freq estimated by the walking frequency estimation unit 38 shown in FIG. 5. More specifically, the oscillator natural frequency calculation unit 43 calculates the oscillator natural frequency $\omega o$ by performing the arithmetic operation shown Equation (8) given below.

$$\omega o = 2\pi \times \text{freq} \quad (8)$$

The oscillator natural frequency ωo calculated with Equation (8) is a variable based on the walking frequency freq of the user U wearing the walking motion assist device 1. However, the oscillator natural frequency calculation unit 43 may retain a predetermined constant as a target walking frequency, or may apply a low-pass filter to the walking frequency freq in calculating the oscillator natural frequency ωo.

The oscillator phase calculation unit 24 executes the process of the oscillator natural frequency calculation unit 43, and then executes the process of the phase oscillator integration calculation unit 44. The phase oscillator integration calculation unit 44 outputs the oscillator phase Φc of the phase oscillator that oscillates synchronously with the lateral displacement phase Φ based on the natural angular frequency ωo of the above-mentioned oscillator, using the lateral displacement phase Φ corrected by the lateral displacement phase correction unit 22 shown in FIG. 8 as an input. More specifically, the phase oscillator integration calculation unit 44 calculates the phase Φc of the phase oscillator that synchronously oscillates by solving the differential equation shown in Equation (9) given below, or by taking into account the phase difference between the lateral displacement phase Φ and the phase oscillator, and by performing the integral operation of the phase change of the phase oscillator corresponding to the natural angular frequency ωo.

$$d\Phi c/dt = \omega o + f(\Phi - \Phi c + \alpha) \quad (9)$$

where f(x) represents a mathematical function, and α is an assist target phase difference for adjusting the oscillator phase Φc. For the assist target phase difference α, the value of the phase delay dp indicating the delay due to the filter and the delay or advance in the foot sensor value is used (i.e., α=dp). f(x) is preferably a mathematical function such that x increases monotonically in the vicinity of 0 (e.g., in the range from −π/4 to π/4). f(x) can be, for example, Equation (10) given below.

$$f(x) = K \sin(x) \quad (10)$$

where K is a constant.

Next, the assist force determination unit 25 of this embodiment shown in FIG. 4 is described in the following. As shown in the block diagram of FIG. 11, the assist force determination unit 25 is provided with various functional units (45, 46) that perform the arithmetic operations or processes described later. The assist force determination unit 25 executes the process of each of these functional units in each predetermined arithmetic process cycle of the control unit 5.

The assist phase calculation unit 45 adjusts the oscillator phase Φc calculated by the oscillator phase calculation unit 24 so that the assist force τ is applied at the timing when such an assist force is required. More specifically, the assist phase calculation unit 45 calculates the assist force phase Φas by performing the arithmetic operation of Equation (11) given below.

$$\Phi as = \Phi c - \beta \quad (11)$$

where β is the target phase difference. In other words, the assist phase calculation unit 45 calculates the assist force phase Φas which is adjusted to apply the assist force at the prescribed timing by subtracting the target phase difference β from the calculated oscillator phase Φc so as to apply the assist force τ at the required phase. The values of the target phase difference β for the assist force of the flexing motion and for the assist force of the extending motion can be set individually at the input interface 27 shown in FIG. 4, and can be stored in the target value storage unit 26.

The target phase difference β is set to a value that can assist the walking motion while controlling the user U as an inverted pendulum. In other words, the target phase difference β is a parameter for the walking pitch and stride length in the inverted pendulum control that assists the walking motion by inducing an appropriate movement of the center of gravity C of the user U (the movement of the center of gravity C in the forward direction or in a lateral direction) by positioning the center of gravity forward or toward the idle leg relative to the grounding point of the leg at the terminal stance (TSt), and by preventing the tipping over of the user by grounding the idle leg by synchronizing the pitch of the leg to the movement of the center of gravity C at a prescribed stride length or at a prescribed walking pitch. The target phase difference β is set to a base value for such a phase difference.

Following the process of the assist phase calculation unit 45, the right-left assist force determination unit 25 executes the process of the right-left assist force calculation unit 46. The right-left assist force calculation unit 46 calculates the left and right assist forces τL and τR based on the assist force phase Φas of the lateral position Py of the center of gravity C. More specifically, the right-left assist force calculation unit 46 performs the calculations of Equations (12) and (13) given below.

$$\tau L = G \times \sin \Phi as \quad (12)$$

$$\tau R = -\tau L \quad (13)$$

where G is a gain. The gain G is a coefficient for setting the strength of the assisting force τ, and may be varied depending on the purpose of use by the user U who wears the walking motion assist device 1 and the physical condition of the user U at the time of use.

Alternatively, the right-left assist force calculation unit 46 may calculate the left assist force τL by referring to a map (or table) in which the assist force T is predetermined in accordance with Equation (14) given below, or, in other words, in dependence on the assist force phase Φas.

$$\tau L = LUT(\Phi as) \quad (14)$$

The user U wearing the walking motion assist device 1 is assisted in the walking motion by the control unit 5 which executes the above processes at the predetermined arithmetic process cycle, and supplies electric power to the left and right drive sources 4L and 4R so that the calculated left and right assisting forces τL and τR may be produced.

Figure 12:
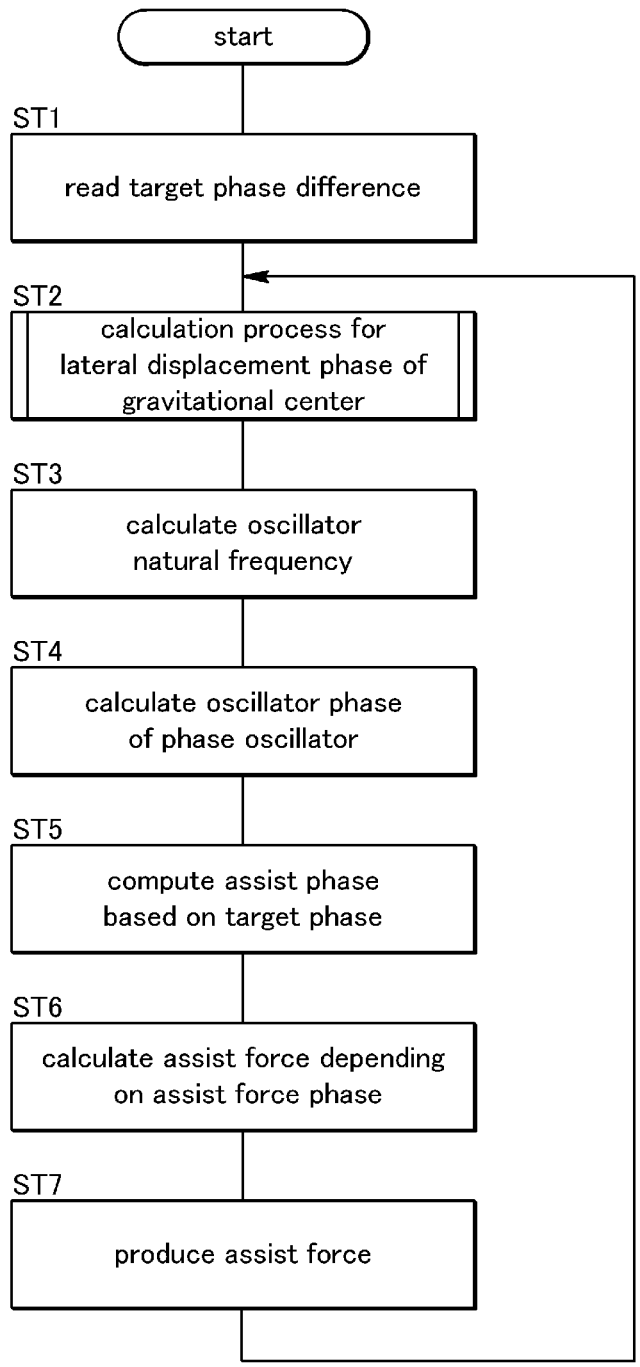
FIG. 12 is a flowchart showing the control process performed by the control unit shown in FIG. 4.

The control unit 5 is configured as described above. FIG. 12 is a flowchart showing the control process executed by the control unit 5 shown in FIG. 4. When the power is turned on, the control unit 5 executes the process shown in FIG. 12 at the predetermined arithmetic process cycle.

The control unit 5 first accesses the target value storage unit 26 and reads the target phase difference β that has been set (step ST1). In the lateral displacement phase calculation unit 21 (FIG. 4), the control unit 5 executes the calculation process of the lateral displacement phase Φ of the center of gravity C based on the lateral acceleration Gy of the center of gravity C detected by the lateral acceleration sensor 6.

Figure 13:
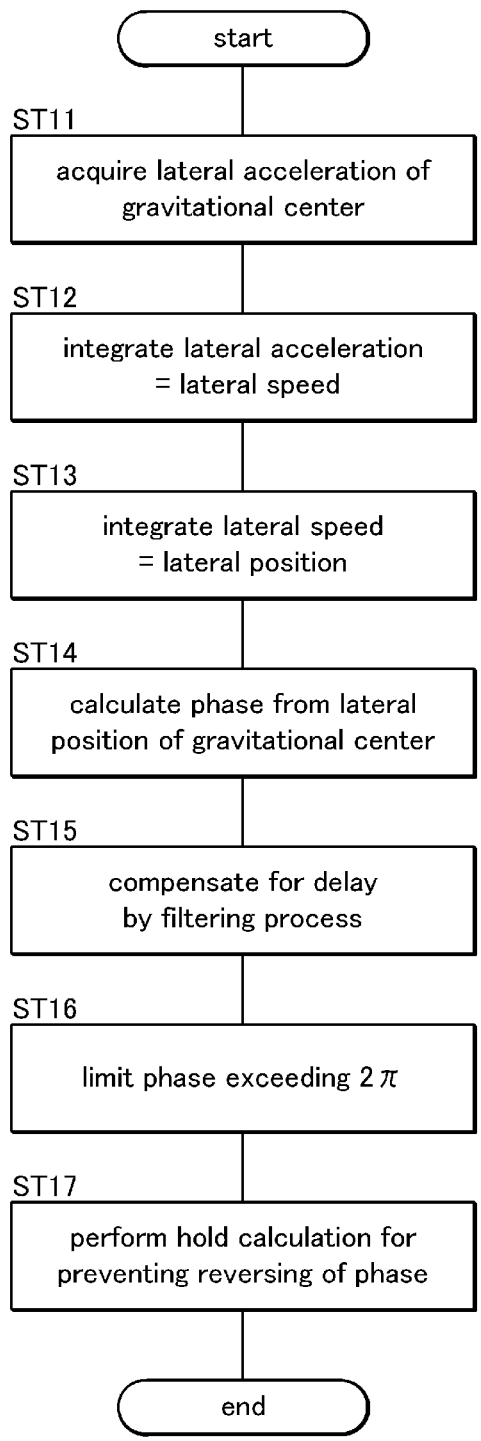
FIG. 13 is a flowchart showing the process of calculating lateral displacement phase of the gravitational center shown in FIG. 12.

FIG. 13 is a flowchart showing the process of calculating the lateral displacement phase Φ of the center of gravity C shown in FIG. 12. The control unit 5 first acquires the lateral acceleration Gy of the center of gravity C (step ST11), and calculates the lateral speed Vy of the center of gravity C by integrating the acquired lateral acceleration Gy of the center of gravity C in the lateral speed calculation unit 32 (FIG. 5) (step ST12). The control unit 5 then calculates the lateral position Py of the center of gravity C by integrating the calculated lateral speed Vy of the center of gravity C in the lateral position calculation unit 33 (FIG. 5) (step ST13).

Subsequently, the control unit 5 calculates the lateral displacement phase Φ (Φr) in the phase extraction unit 36 (FIG. 5) by executing Equation (5) given above based on the lateral position Py of the center of gravity C (step ST14). Thereafter, the control unit 5 performs a correction process to compensate the phase delay dp with respect to the lateral displacement phase Φ by executing the above equations (6) and (7) in the phase delay estimation unit 39 (FIG. 8) and the phase delay correction unit 40 (FIG. 8) (step ST15). Thereafter, the control unit 5 executes a correction process to limit the value of the lateral displacement phase Φ to 2π when the lateral displacement phase Φ exceeds 2π (rad) in the phase limiting unit 41 (FIG. 8) (step ST16), and executes a correction process to hold the lateral displacement phase Φ in the phase hold unit 42 (FIG. 8) by executing a phase reversion prevention calculation so that the lateral displacement phase Φ does not revert to a smaller value (step ST17).

Referring now back to FIG. 12, following the calculation process of the lateral displacement phase Φ of the center of gravity C in step ST2, the control unit 5 calculates the oscillator natural frequency ωo in the oscillator natural frequency calculation unit 43 (FIG. 10) of the oscillator phase calculation unit 24 by executing Equation (8) given above based on the walking frequency freq (step ST3). Thereafter, control unit 5 calculates the oscillator phase Φc of the phase oscillator that oscillates synchronously with the lateral displacement phase Φ based on the natural angle frequency ωo of the above-mentioned oscillator by executing Equation (9) given above in the phase oscillator integration calculation unit 44 (FIG. 10) (step ST4).

Next, the control unit 5 calculates the assist force phase Φas in the assist phase calculation unit 45 (FIG. 11) of the assist force determination unit 25 by executing the Equation (11) given above based on the target phase difference β (step ST5). The control unit 5 then calculates the left and right assist forces τL and τR by executing any of the Equations (12) to (14) given above in the right-left assist force calculation unit 46 (FIG. 11) of the assist force determination unit 25 (step ST6), and outputs the calculated left and right assist forces τL and τR (step ST7). The control unit 5 assists the walking motion of the user U wearing the walking motion assist device 1 by repeating the above steps. In other words, the control unit 5 drives the main frame 2, the subframe 3, and the drive sources 4 which jointly form an assist drive unit configured to support the hip joint movements, in coordination with the displacement (movement) of the center of gravity C of the user U.

The effect of the walking motion assist device 1 configured as discussed above is described in the following. The walking motion assist device 1 is provided with a lateral acceleration sensor 6 which is placed on the torso of the user U to detect the lateral displacement of the center of gravity C of the user U. The control unit 5 estimates the lateral displacement phase Φ in the walking motion of the user U based on the detection result of the lateral acceleration sensor 6, and drives the left and right drive sources 4L, 4R at a predetermined assist force phase Φas which indicates the lateral position Py of the predetermined center of gravity C. Thus, the walking motion assist device 1 is highly versatile because it can assist the hip joint movement at the desired lateral position Py of the center of gravity C. Furthermore, since the walking motion is supported based on the center of gravity C as assisted by the walking motion assist device 1 (by feeding back the left and right displacements of the center of gravity C), the walking motion of the user U can be assisted via the assistance of the hip joint movement without causing a sense of discomfort to the user U in the walking motion. In addition, the structure is simplified because the displacement of the center of gravity C of the user U can be detected by the lateral acceleration sensor 6 placed on the torso of the user U.

Based on the detection result of the lateral acceleration sensor 6, the control unit 5 estimates the grounding timing of the leg of the user U by performing calculations such as the those represented by Equations (6) and (7) in the lateral displacement phase calculation unit 21 and the lateral displacement phase correction unit 22 (FIGS. 4, 6, and 8), and performs calculations such as those represented by Equations (9) and (11) in the assist force calculation unit 23 (FIGS. 4, 10, and 11) to drive the right and left drive sources 4L, 4R with a predetermined target phase difference β with respect to the estimated grounding timing. Thus, since the control unit 5 can drive the right and left drive sources 4L, 4R by using the lateral position Py of the center of gravity C at the grounding timing as a reference, the walking motion assist device 1 can perform various types of motion assistance in a highly versatile manner.

Since the lateral acceleration sensor 6 detects the lateral acceleration Gy of the torso of the user U, the lateral displacement of the center of gravity C of the user U can be detected by using an inexpensive acceleration sensor.

In addition, since the lateral acceleration sensor 6 detects the lateral acceleration Gy which is the lateral acceleration of the torso of the user U, right and left can be distinguished in estimating the phase of the walking motion of the user U.

The left and right drive sources 4L and 4R provide an assist force τ to the femoral parts of the user U to assist the flexing and extending movements of the hip joints so that the user can be assisted in the walking motion by the flexing and extending of the hip joints which require a relatively large force.

The control unit 5 drives the assist drive unit consisting of the main frame 2, the subframe 3 and the drive sources 4 in coordination with the displacement (movement) of the center of gravity C of the user U so that the movement of the hip joints associated with the walking motion can be assisted in coordination with the displacement of the center of gravity C of the user U (center of gravity movement), thus minimizing the discomfort that the user U may experience.

Second Embodiment

A second embodiment of the present invention is described in the following with reference to FIGS. 14 to 16. In the following description, the parts corresponding to those in the first embodiment in terms of either configuration or function are denoted with like numerals without repeating the description of such parts.

Figure 14:
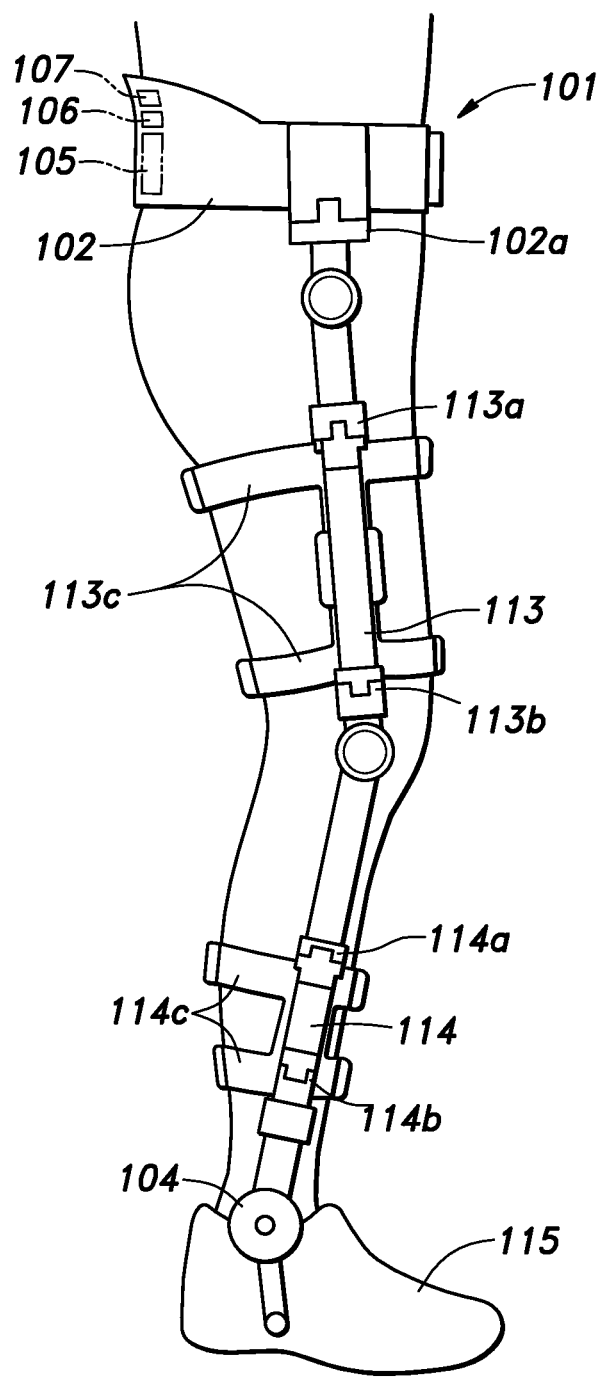
FIG. 14 is a side view of a walking motion assist device according to a second embodiment of the present invention.

FIG. 14 is a side view of the walking motion assist device 101 of the second embodiment. As shown in FIG. 14, the walking motion assist device 101 is provided with a main frame 102 that is attached to the torso of the user U. The main frame 102 is connected to the left and right femoral frames 113 positioned along the respective femoral parts of the user U so that femoral frames 113 can be displaced around the respective hip joints of the user U. The lower end of each femoral frame 113 is connected to a leg frame 114 which is placed along the outer side of the corresponding lower leg of the user U so that the leg frame 114 can be displaced around the knee joint of the user U. The lower end of each lower leg frame 114 is connected to a foot support 115 attached to the corresponding foot of the user U via a drive source 104 so that the foot support 115 can be displaced around the ankle joint of the user U.

The main frame 102 is provided with left and right hinges 102a located above the connecting portions with the femoral frames 113, respectively. A control unit 105 and a battery are provided on the main frame 102. The main frame is provided with a lateral acceleration sensor 106 which detects the lateral acceleration Gy of the torso of the user U, and a vertical acceleration sensor 107 which detects the vertical acceleration Gx of the torso of the user U. The lateral acceleration sensor 106 and the vertical acceleration sensor 107 are positioned in a substantially laterally middle point of the main frame 102 and slightly higher than the drive source 104 so as to be as close to the center of gravity C of the user U as possible. In the illustrated embodiment, the lateral acceleration sensor 106 and the vertical acceleration sensor 107 are positioned behind the center of gravity C. The signal representing the lateral acceleration Gy provided by the lateral acceleration sensor 106 and the signal representing the vertical acceleration Gx provided by the vertical acceleration sensor 107 are forwarded to the control unit 105.

Each femoral frame 113 is provided with an upper hinge 113a and a lower hinge 113b at the top and bottom ends thereof, respectively, and is attached to a femoral part of the user U by a femoral support member 113c. Each lower leg frame 114 is also provided with an upper hinge 114a and a lower hinge 114b at the top and bottom ends thereof, respectively, and is attached to the lower leg by a lower leg support member 114c. Each foot support 115 is in the shape of a shoe, and is directly attached to the corresponding foot of the user U.

Each drive source 104 includes an electric motor, and applies an ankle joint assist torque to the foot support 115 while accounting for the reaction force by receiving electric power supplied by a battery (not shown in the drawings) under the control of the control unit 105 so as to produce the required foot angle joint assist torque centered around the ankle joint. As a result, the foot support 115 is driven in the plantar flexion and dorsiflexion directions.

The walking motion assist device 101 thus configured assists the walking motion of the user U wearing the walking motion assist device 101 by acting on the user U through the lower leg frames 114 and the foot supports 115 as a walking aid for plantar flexion and dorsiflexion of the feet with the power of the battery-powered drive sources 104.

Figure 15:
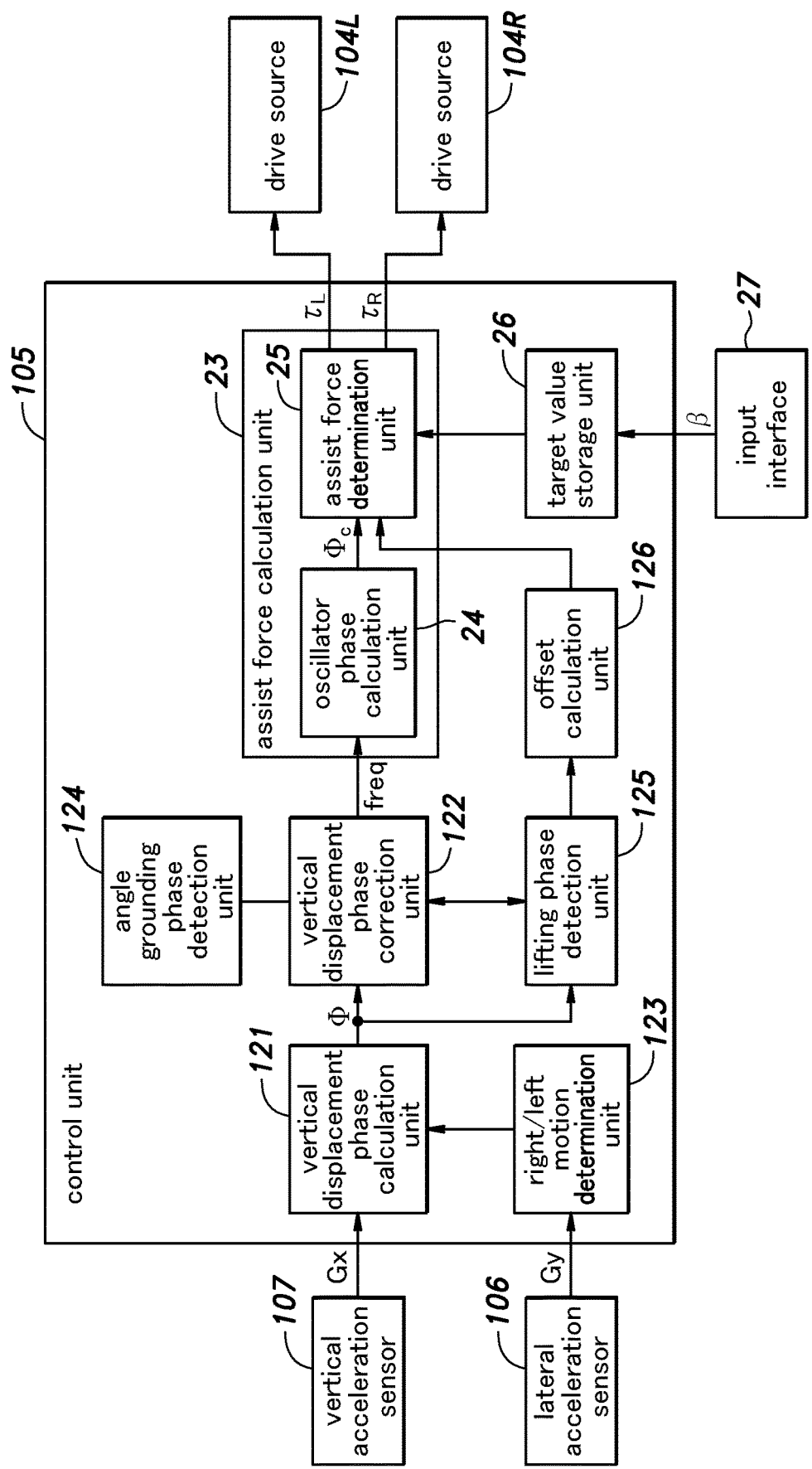
FIG. 15 is a block diagram showing the structure of the control unit shown in FIG. 14.

FIG. 15 is a block diagram showing the structure of the control unit 105 shown in FIG. 14. As shown in FIG. 15, the control unit 105 is similar to the control unit 5 of the first embodiment shown in FIG. 4. Instead of the lateral displacement phase calculation unit 21 of FIG. 4, the control unit 105 of this embodiment is provided with a vertical displacement phase calculation unit 121 which calculates various values such as a vertical displacement phase Φ (which is the phase of the center of gravity C in the walking motion of the user U), and a walking frequency freq based on the vertical acceleration Gx detected by the vertical acceleration sensor 107, and a right-left motion determination unit 123 which distinguishes right and left in the walking motion of the user U based on the lateral acceleration Gy of the center of gravity C detected by the lateral acceleration sensor 6. In addition, instead of the lateral displacement phase correction unit 22 of FIG. 4, the control unit 105 of the present embodiment is provided with a vertical displacement phase correction unit 122 that corrects the vertical displacement phase Φ calculated by the vertical displacement phase calculation unit 121. Furthermore, in the present embodiment, the vertical displacement phase correction unit 122 is provided with a heel grounding phase detection unit 124 that detects the heel grounding phase of the leg, and the control unit 105 is further provided with an off-ground phase detection unit 125 that detects the disengagement phase which is the phase of the toe of the leg leaving the ground based on the vertical displacement phase Φ calculated by the vertical displacement phase calculation unit 121 and the heel grounding phase detected by the heel grounding phase detection unit 124, and an offset calculation unit 126 that calculates a phase offset (which will be discussed hereinafter) based on the off-ground phase of the leg detected by the off-ground phase detection unit 125. The +second embodiment is otherwise similar to the first embodiment.

Although not shown in the drawings, following the process of the first low-pass filter 31, the vertical displacement phase calculation unit 121 calculates the vertical speed Vx of the center of gravity C by integrating the vertical acceleration Gxf of the center of gravity C which is processed by the first low-pass filter 31. Following the calculation of the vertical speed Vx, the vertical displacement phase calculation unit 121 calculates the vertical position Px of the center of gravity C by integrating the calculated vertical speed Vx of the center of gravity C. Following the calculation of the vertical position Px, the vertical displacement phase calculation unit 121 normalizes the vertical position Px of the center of gravity C according to a predetermined rule, and also normalizes the vertical speed Vx of the center of gravity C according to a predetermined rule. Based on the normalized vertical speed Vxn and the normalized vertical position Pxn, the vertical displacement phase calculation unit 121 calculates the vertical displacement phase Φr by performing an inverse tangent operation. At this time, by reversing the positive and negative signs of the vertical speed Vxn and the vertical position Pxn, and executing the inverse tangent operation, the vertical displacement phase Φr which becomes 0 [rad] when the vertical acceleration Gx of the center of gravity C is at the minimum peak is calculated. As shown in FIG. 3, the minimum peak of the vertical acceleration Gx of the center of gravity C appears slightly later than the grounding timing of the leg, and is substantially in synchronism with the leg off-ground timing.

Meanwhile, the calculated vertical displacement phase Φr represents the progress of the walking motion of each walking cycle consisting of a single step of the left or right leg in the walking motion, and two consecutive cycles of the vertical displacement phase Φr represent the progress of the walking motion of two steps in total, one step each for the upper leg and the lower leg (right leg and left leg). As discussed earlier with reference to FIG. 3, the vertical position Px of the center of gravity C has a cycle period of ½ of the walking cycle period, and it is not possible to determine whether the peak of the vertical acceleration Gx on the minimum side is due to the grounding of the heel of either the left or right leg. Therefore, the vertical displacement phase calculation unit 121 determines one of the two cycle periods of the vertical displacement phase Φr to be one step of the left leg and the other to be one step of the right leg based on the determination result of the right-left motion determination unit 123.

Since the vertical displacement phase Φr calculated in this manner has a cycle period of ½ of the walking cycle, the vertical displacement phase Φr can be calculated by the vertical displacement phase correction unit 122 as a vertical displacement phase Φ which is more accurate than the lateral displacement phase Φ in the first embodiment. In addition, as explained in conjunction with FIG. 3, since the vertical displacement phase Φr becomes 0 (rad) with a slight delay from the grounding of the heel of either the right leg or the right leg, and the value of the phase delay dp (see Equation (7) given above) used for correcting the phase delay in the vertical displacement phase correction unit 122 is smaller, the heel grounding timing of the left or right leg (when the oscillator phase Φc is 0 (rad)) can be more accurately estimated. The heel grounding phase detection unit 124 provides the heel grounding phase which is compensated for this delay with the phase delay dp (see Equation (7) given above) calculated in the vertical displacement phase correction unit 122.

The off-ground phase detection unit 125 detects an off-ground phase (which is the phase at which the toe leaves the ground) from the vertical displacement phase Φ, based on the heel grounding phase that is compensated for the delay. The offset calculation unit 126 calculates the phase offset based on the off-ground phase detected by the off-ground phase detection unit 125 and provides the phase offset to the assist force determination unit 25. The assist force determination unit 25 delays the oscillator phase Φc by an amount of the phase offset (shifting the entire waveform) by setting the value of the phase offset to the assist target phase difference α which is a value for adjusting the oscillator phase Φc. The phase offset is discussed in the following.

Figure 16:
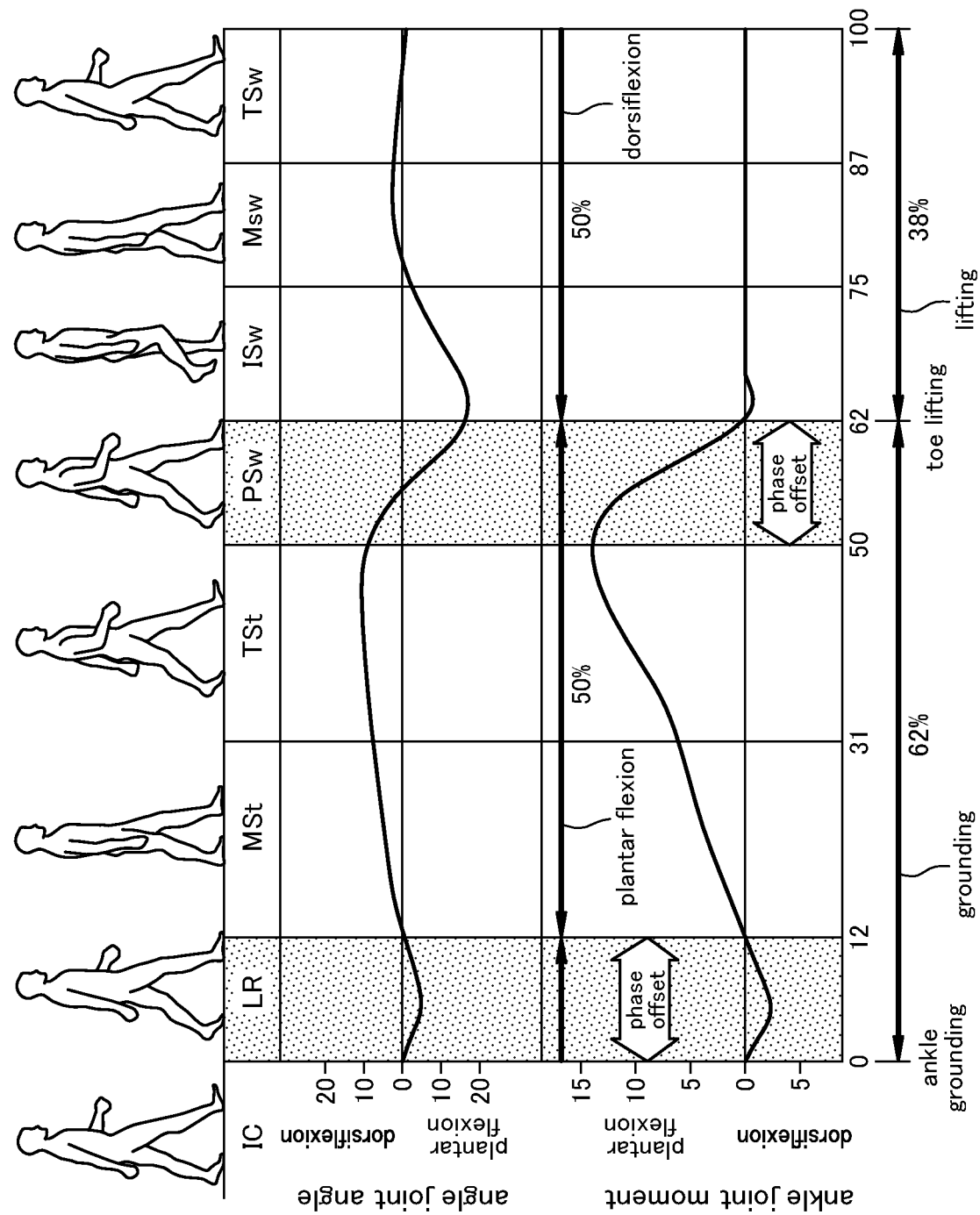
FIG. 16 is a time chart showing the movement of the ankle joint during the walking motion of the human.

FIG. 16 is a time chart showing the movement of the ankle joint in the walking motion of human P. As shown in FIG. 16, the motion of the right foot in walking motion progresses in the sequence of IC (Initial Contact), LR (loading Response), MSt (Mid Stance), TSt (Terminal Stance), PSw (Pre-Swing), ISw (Initial Swing), MSw (Mid Swing), and TSw (Terminal Stance). In regard to the right foot, the heel is grounded with the ankle joint angle approximately at 0 degrees in IC, the ankle joint angle is set to the plantar flexion side in LR, and then the load is received while setting the ankle joint angle to approximately 0 degrees. Thereafter, the ankle joint angle is increased to the dorsiflexion side from MSt to TSt. Then, in regard to the right foot, the load is released and the toe is lifted from the ground while the ankle joint angle is changed from the dorsiflexion side to the plantar flexion side in PSw. The angle joint angle is returned to substantially zero angle in ISw. Then, the right leg returns to IC while maintaining the ankle joint angle substantially at zero degrees in MSw and TSw.

The human P applies a large plantar flexion force (moment) to the ankle joint from MSst to PSw and a small dorsiflexion force (moment) to the ankle joint from ISw to LR. From ISw to TSw, the dorsiflexion force is very small and substantially zero. The force applied to the ankle joint is approximately 50% each in plantar flexion and dorsiflexion, assuming that the time or phase of one cycle is 100%. On the other hand, the human P keeps the right foot grounded from IC to PSw, and lifts the right foot from the ground from ISw to TSw. The grounding time (phase) of the right foot is about 62%, while the off-ground time of the right foot (phase) is about 38%. In other words, the human P is grounding the right foot during LR of the right foot, and is grounding the both feet during PSw of the right foot.

The human P starts applying a plantar flexion force to the right foot a short time (approximately 12% of the cycle time) after the heel is grounded in IC. The phase from the start of IC to the beginning of the plantar flexion is referred to as phase offset. During PSw of the right foot, the phase offset occurs to the left foot. This phase offset is calculated by subtracting 50% from the time point at which the toe leaves the ground at the end of PSw.

In order to assist the walking motion by applying such an assist force τ to the ankle joint, the assist force calculation unit 23 (FIG. 15) sets an assist target phase difference α, a value for adjusting the oscillator phase Φc so that the assist force τ is exerted at the timing to be assisted (at the timing delayed from IC by the phase offset), to a value corresponding to the above mentioned phase offset. As a result, the timing of the oscillator phase Φc becoming 0 (rad) (the timing at which the assist force τ of bottoming starts) is set to the timing at which the plantar flexion starts.

As described above, the target phase difference β is also a parameter for the walking pitch and the stride length in the inverted pendulum control for assisting the walking motion, and the target phase difference β is adjusted such that the walking motion of the user U can be assisted while executing the inverted pendulum control. For example, the assist force determination unit 25 may select the absolute value of the target phase difference β to be greater than the value of the above phase offset to delay the assist force for the plantar flexion.

Thus, the walking motion assist device 101 of this embodiment detects the vertical acceleration Gx of the torso of the user U, which is closely related to the grounding and lifting of the foot in the walking motion, with the vertical acceleration sensor 107, and estimates the vertical displacement phase Φ in the walking motion of the user U based on the vertical acceleration Gx. Therefore, the phase in the walking motion of the user U can be estimated with a high precision.

In addition, the left and right drive sources 104 apply assist forces τ (τL, τR) to the feet of the user U to assist the plantar flexion and dorsiflexion of the ankle joint, so that the walking motion can be assisted via the plantar flexion and dorsiflexion of the ankle joint which have a major effect on the displacement of the center of gravity C.

The present invention has been described in terms of specific embodiments, but the present invention is not limited by such embodiments, and can be modified in various without departing from the scope of the present invention. For example, in the foregoing embodiments, the walking motion assist device 1, 101 was described as an example of the travel motion assist device, but may also be arranged such that the assist drive unit that assists the joint movements associated with the traveling motion with a stimulus applying means that applies a stimulus to a muscle of the user, and traveling motion such as walking motion may be assisted by the stimulus applying means. According to such a configuration, the assist drive unit can be easily and lightly configured and the travel motion assist device can be made compact.

The assist drive unit that assists the prescribed joint movements associated with the travel motion may be configured to provide an assist force τ to the lower leg of the user U to assist the flexion and extension movements of the knee joint, or to provide an assist force τ to the arm of the user U to assist the flexion and extension movement of the shoulder joint. By assisting the flexion and extension movements of the knee joint, it is possible to assist in the flexion and extension of the knee joint, which is one of the main movements in the travel motion and is necessary for a smooth gait. By assisting the flexion and extension of the shoulder joint, it is possible to assist the flexion and extension of the shoulder joint performed with or in advance of the left and right legs in the travel motion.

In addition, the travel motion assist device may be further provided with a gyro sensor for detecting the rotational speed and tilt angle of the torso of the user U so that the control unit 5 may estimate the phase of the travel motion of the user U based on the rotational speed and tilt angle detected by the gyro sensor. Since the center of gravity C of the user U is in a part of the torso slightly forward of the pelvis, the acceleration of the center of gravity C cannot be directly measured. However, in the travel motion of the user U, the tilt motion of the torso may appear with or in advance of the displacement of the center of gravity C. According to this configuration, it is possible to more accurately estimate the phase in the travel motion of the user U which accompanies the tilt motion of the torso.

In the foregoing embodiments, the movement of the assist drive unit is controlled by the control unit 5, 105 based on the displacement of the center of gravity C of the user U detected by the lateral acceleration sensor 6 and the vertical acceleration sensor 107. However, the movement of the assist drive unit may be also controlled by the control unit 5, 105 based on the detection result of a torso motion detection sensor which detects the movement of the torso (upper body) of the user U such as the vertical displacement, the lateral displacement, the fore and aft displacement, the rotational angle, the inclination angle, etc. of the torso.

In this way, the control unit 5, 105 drives the assist drive unit in coordination with the motion of the torso of the user U based on the rotational speed or inclination angle of the torso of the user U, so that the prescribed joint movements associated with the travel motion can be assisted while coordinating with the torsional (yaw) motion of the torso of the user U, for example, when the user U is walking in Namba walking (biaxial walking).

In the above first embodiment, the lateral displacement phase calculation unit 21 calculated the lateral displacement phase $\Phi r$ by the inverse tangent operation of the lateral position Py of the center of gravity C. However, the lateral displacement phase $\Phi r$ may also be discretely estimated by identifying the leftmost timing of the lateral position Py of the center of gravity C and the rightmost timing of the lateral position Py of the center of gravity C from the sign (positive or negative) of the lateral speed Vy of the center of gravity C. Similarly, as a modification of the second embodiment, instead of calculating the vertical displacement phase $\Phi$ by the inverse tangent operation of the vertical position Px of the center of gravity C, the vertical displacement phase $\Phi$ may be discretely estimated by the vertical displacement phase calculation unit 121 by identifying the topmost timing and the bottommost timing of the vertical position Px of the center of gravity C from the sign (positive or negative) of the vertical speed Vx of the center of gravity C. In this case, by regarding the bottommost timing of the detected center of gravity C as the grounding of the heel, the vertical displacement phase $\Phi$ can be reset to 0 rad.

In the above embodiments, the lateral displacement phase calculation unit 21 (or the vertical displacement phase calculation unit 121) used a fast Fourier transform or a wavelet transform to estimate the gait frequency freq, but it may simply measure the peak to peak time of the lateral position Py (or the vertical position Px) of the center of gravity C, and calculate the inverse of the peak to peak time as the gait frequency freq. In the second embodiment, the walking motion assist device 101 was equipped with a lateral acceleration sensor 106 in addition to the vertical acceleration sensor 107, but instead of the lateral acceleration sensor 106, a foot sensor that detects the grounding and lifting of the soles of the feet may be provided in the foot support 115 to determine which of the left and right legs is grounded based on the detection results of the foot sensor, or a gyro sensor may be provided in the at least one of the femoral frames 113 to determine which of the left and right legs is grounded based on the motion state (flexion or extension) of the leg. Furthermore, when the foot sensor is provided, it may be arranged such that the vertical displacement phase correction unit 122 (or the lateral displacement phase correction unit 22) calibrates the output of the foot sensor by motion capturing, and compensate the delay or advance of the phase of the position of the gravitational sensor (the vertical displacement phase $\Phi$ or the lateral displacement phase $\Phi$) based on the phase computed from the calibrated output.

In the foregoing embodiment, the oscillator phase calculation unit 24 calculated the oscillator natural frequency ωo based on the gait frequency freq, but as shown in Equation (15) given below, the oscillator natural frequency ωo may be sequentially corrected to converge the phase difference between the calculated displacement phase of the user U (lateral displacement phase $\Phi$ or vertical displacement phase $\Phi$) and the oscillator phase $\Phi c$, which serves as a reference for the assist action, to the assist target phase difference α, as shown in Equation (15) given below.

$$\omega o(t+1) = \omega o(t) + G((\Phi - \Phi c) - \alpha) \quad (15)$$

where G is gain.

In the foregoing embodiments, the assist force calculation unit 23 calculated the assist force according to the assist force phase $\Phi as$ by referring to a map, but the assist force may be determined by defining an oscillator for flexion motion and an oscillator for extension motion (or an oscillator for dorsiflexion motion and an oscillator for plantar flexion motion), and calculate the assist force so that a target phase difference β is provided for the oscillator phase $\Phi c$ of the oscillators.

In addition, the specific configuration, arrangement, quantity, angle, procedure, etc. of each member or part can be changed as appropriate as long as the purpose of the invention is not deviated from. Moreover, the above embodiments may be combined. On the other hand, each component shown in the above embodiment is not necessarily essential, and can be selected as appropriate.

Glossary of Terms

1: walking motion assist device
2: mainframe (assist drive unit)
3: subframe (assist drive unit)
4: assist drive unit
5: control unit
6: lateral acceleration sensor (torso motion detection unit)
21: lateral displacement phase operation unit
22: lateral displacement phase correction unit
23: assist force calculation unit
24: oscillator phase calculation unit
25: assist force determination unit
26: target value storage unit
27: input interface
36: phase extraction unit
44: phase oscillator integration calculation unit
45: assist phase calculation unit
101: walking motion assist device
104: assist drive unit
105: control unit
106: lateral acceleration sensor (torso motion detection unit)

107: vertical acceleration sensor (torso motion detection unit)
114: lower leg frame (assist drive unit)
115: assist drive unit
121: vertical displacement phase calculation unit
122: vertical displacement phase correction unit
23: lateral motion determination unit
C: center of gravity
Gx: vertical acceleration
Gy: lateral acceleration
P: human
U: user
α: assist target phase difference
β: target phase difference
τ: assist force

The invention claimed is:

1. A travel motion assist device configured to be worn by a user to assist a travel motion of the user, comprising:
   an assist drive unit configured to be worn on a prescribed joint of the user required for the travel motion of the user, and to be driven so as to assist a prescribed joint movement associated with the travel motion;
   a torso motion detection unit configured to be worn on a torso of the user, and to detect a motion of the torso of the user; and
   a control unit configured to control an operation of the assist drive unit;
   wherein the torso motion detection unit detects at least a lateral motion of the torso of the user; and
   wherein the control unit estimates a phase of the travel motion of the user by computing a lateral position and a lateral speed of the torso of the user according to a detection result of the torso motion detection unit, and executing an inverse tangent operation based on the computed lateral position and lateral speed, and drives the assist drive unit at a prescribed phase, the phase of the travel motion representing a progress of motion in each cycle of the travel motion consisting of two steps in a phase plane of the lateral position and the lateral speed.

2. The travel motion assist device according to claim 1, wherein the control unit is configured to estimate a grounding timing of a leg of the user according to the detection result of the torso motion detection unit, and to drive the assist drive unit at a prescribed phase difference relative to the estimated grounding timing.

3. The travel motion assist device according to claim 1, wherein the torso motion detection unit includes an acceleration sensor that detects an acceleration of the torso of the user.

4. The travel motion assist device according to claim 3, wherein the acceleration sensor includes a lateral acceleration sensor that detects a lateral acceleration of the torso of the user.

5. The travel motion assist device according to claim 3, wherein the acceleration sensor includes a vertical acceleration sensor that detects a vertical acceleration of the torso of the user.

6. The travel motion assist device according to claim 1, wherein the assist drive unit is configured to apply an assist force to a femoral part of the user to assist a flexing motion and an extending motion of a hip joint of the user.

7. The travel motion assist device according to claim 1, wherein the assist drive unit is configured to apply an assist force to a foot of the user to assist a plantar flexion motion and a dorsiflexion motion of an ankle joint of the user.

8. The travel motion assist device according to claim 1, wherein the control unit is configured to drive the assist drive unit in synchronism with a movement of the torso of the user.

9. The travel motion assist device according to claim 8, wherein the control unit is configured to drive the assist drive unit in synchronism with the movement of the torso of the user which is based on at least a rotational speed or an inclination angle of the torso of the user.

* * * * *